(12) United States Patent
Özden et al.

(10) Patent No.: US 11,959,331 B2
(45) Date of Patent: Apr. 16, 2024

(54) BUILDING APERTURE COVER WITH VIG UNIT CONNECTED TO FIXATION PROFILE

(71) Applicant: VKR HOLDING A/S, Hørsholm (DK)

(72) Inventors: Utku Ahmet Özden, Hørsholm (DK); Jacob Christian Molbo, Hørsholm (DK); Jens Troels Plesner Kristensen, Hørsholm (DK)

(73) Assignee: VKR HOLDING A/S, Hørsholm (DK)

( * ) Notice: Subject to any disclaimer, the term of this patent is extended or adjusted under 35 U.S.C. 154(b) by 104 days.

(21) Appl. No.: 17/422,495

(22) PCT Filed: Jan. 13, 2020

(86) PCT No.: PCT/DK2020/050015
§ 371 (c)(1),
(2) Date: Jul. 13, 2021

(87) PCT Pub. No.: WO2020/147906
PCT Pub. Date: Jul. 23, 2020

(65) Prior Publication Data
US 2022/0081958 A1    Mar. 17, 2022

(30) Foreign Application Priority Data

Jan. 14, 2019 (DK) .............................. PA201970020
Jan. 14, 2019 (DK) .............................. PA201970021
(Continued)

(51) Int. Cl.
*E06B 3/02* (2006.01)
*E04D 13/03* (2006.01)
(Continued)

(52) U.S. Cl.
CPC ............ *E06B 3/6612* (2013.01); *E04D 13/03* (2013.01); *E04D 13/031* (2013.01);
(Continued)

(58) Field of Classification Search
CPC ... E06B 3/025; E06B 3/24; E06B 3/54; E06B 3/5454; E06B 3/5481; E06B 3/549;
(Continued)

(56) References Cited

U.S. PATENT DOCUMENTS

| 1,117,340 A | * | 11/1914 | Crittall | ...................... E06B 3/24 |
| | | | | 52/786.13 |
| 2,497,515 A | * | 2/1950 | Pearse | ...................... E06B 3/56 |
| | | | | 52/DIG. 1 |

(Continued)

FOREIGN PATENT DOCUMENTS

| CA | 2711832 A1 | * | 2/2011 | ............ E06B 3/549 |
| CN | 2835403 Y | | 11/2006 | |

(Continued)

OTHER PUBLICATIONS

International Search Report for corresponding application PCT/DK2020/050008 filed Jan. 13, 2020; dated Apr. 3, 2020.
(Continued)

*Primary Examiner* — Ryan D Kwiecinski
(74) *Attorney, Agent, or Firm* — CANTOR COLBURN LLP

(57) ABSTRACT

The present disclosure relates to an aperture covering, such as a building aperture covering. The aperture covering comprises a VIG unit 3 and a frame. The frame (2) comprises elongated fixation profiles (6) each of which are fixed to and arranged parallel to an elongated structural frame member (8). The fixation profile (6) comprises a fixation wall (6a) which extends opposite to an exterior major surface (S1) of the vacuum insulated glass unit (3) and is fixed to the exterior major surface (S1) of the vacuum insulated glass unit (3) by means of a bonding seal (9). The fixation profile (6) comprises a connection member (6b) extending from the fixation wall (6a), wherein the connection member (6b) is fixed to the elongated, structural frame
(Continued)

Figure 1:
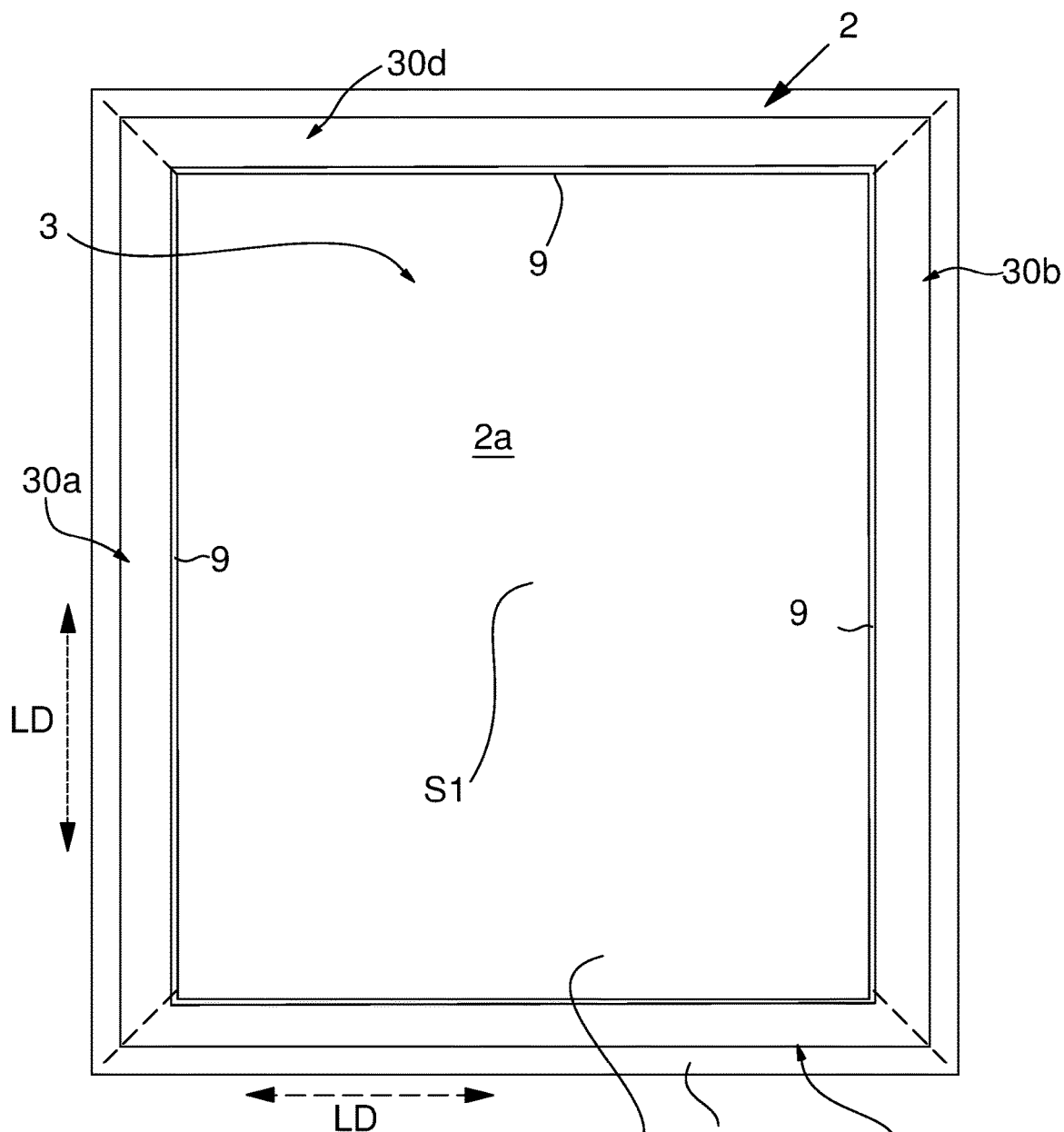

member (8). The elongated structural member (8) faces the opposite interior major surface (S2) of the vacuum insulated glass unit (3) placed opposite to the exterior major surface (S1) of the vacuum insulated glass unit.

20 Claims, 11 Drawing Sheets

(30) Foreign Application Priority Data

| Jan. 14, 2019 | (DK) | .............................. PA201970022 |
|---|---|---|
| Jan. 14, 2019 | (DK) | .............................. PA201970023 |
| Jan. 14, 2019 | (DK) | .............................. PA201970024 |
| Jan. 14, 2019 | (DK) | .............................. PA201970025 |
| Jan. 14, 2019 | (DK) | .............................. PA201970026 |

(51) Int. Cl.

| *E04D 13/035* | (2006.01) |
|---|---|
| *E06B 3/14* | (2006.01) |
| *E06B 3/54* | (2006.01) |
| *E06B 3/56* | (2006.01) |
| *E06B 3/62* | (2006.01) |
| *E06B 3/66* | (2006.01) |
| *E06B 3/677* | (2006.01) |
| *E06B 7/23* | (2006.01) |

(52) U.S. Cl.
CPC ....... *E04D 13/0315* (2013.01); *E04D 13/035* (2013.01); *E04D 13/0351* (2013.01); *E04D 13/0354* (2013.01); *E06B 3/025* (2013.01); *E06B 3/14* (2013.01); *E06B 3/5427* (2013.01); *E06B 3/5454* (2013.01); *E06B 3/5481* (2013.01); *E06B 3/56* (2013.01); *E06B 3/62* (2013.01); *E06B 3/6621* (2013.01); *E06B 3/677* (2013.01); *E06B 7/2301* (2013.01); *E06B 7/2305* (2013.01); *E06B 2003/6208* (2013.01); *E06B 2003/6229* (2013.01); *E06B 2003/6238* (2013.01); *E06B 2003/6291* (2013.01); *Y02A 30/249* (2018.01); *Y02B 80/22* (2013.01)

(58) Field of Classification Search
CPC . E06B 3/5427; E06B 3/56; E06B 3/62; E06B 3/6612; E06B 3/66304; E06B 2003/2625
See application file for complete search history.

(56) References Cited

U.S. PATENT DOCUMENTS

| 2,595,927 | A |   | 5/1952  | Chapin    |                    |
|-----------|---|---|---------|-----------|--------------------|
| 2,781,561 | A |   | 2/1957  | Gifford   |                    |
| 2,902,727 | A | * | 9/1959  | Samolis   | ............... E06B 1/6053 |
|           |   |   |         |           | 52/214             |
| 3,686,795 | A |   | 8/1972  | La Barge  |                    |
| 3,861,085 | A | * | 1/1975  | Jacob     | ..................... E06B 3/308 |
|           |   |   |         |           | 49/501             |
| 4,134,234 | A |   | 1/1979  | Auger     |                    |
| 4,134,238 | A | * | 1/1979  | Auger     | ................... E06B 3/5409 |
|           |   |   |         |           | 52/656.5           |
| 4,887,402 | A | * | 12/1989 | Da Col    | ................. E06B 3/5427 |
|           |   |   |         |           | 52/235             |
| 4,947,604 | A | * | 8/1990  | Sylvester | ................... E06B 3/56 |
|           |   |   |         |           | 52/204.593         |
| 5,216,855 | A | * | 6/1993  | Richter   | ................. E06B 3/5821 |
|           |   |   |         |           | 52/204.593         |
| 5,373,672 | A | * | 12/1994 | Schulz    | ................. E06B 3/5427 |
|           |   |   |         |           | 52/235             |
| 5,891,536 | A | * | 4/1999  | Collins   | ............... E06B 3/66304 |
|           |   |   |         |           | 52/786.13          |
| 6,014,872 | A | * | 1/2000  | Hartig    | ................ C03C 17/3618 |
|           |   |   |         |           | 65/32.4            |
| 6,263,623 | B1| * | 7/2001  | Weiss     | ................ E04D 13/0305 |
|           |   |   |         |           | 52/200             |
| 6,295,774 | B1| * | 10/2001 | Lindgren  | ............... E04D 13/031 |
|           |   |   |         |           | 52/204.1           |
| 6,435,360 | B1|   | 8/2002  | Anin      |                    |
| 6,435,630 | B1| * | 8/2002  | Anin      | ..................... A47F 3/0434 |
|           |   |   |         |           | 52/786.13          |
| 6,546,692 | B1| * | 4/2003  | Duncan    | ............. B32B 17/10018 |
|           |   |   |         |           | 52/786.13          |
| 7,588,653 | B2| * | 9/2009  | Crandell  | .................... E06B 3/24 |
|           |   |   |         |           | 52/204.5           |
| 7,765,769 | B2| * | 8/2010  | Rosskamp  | ................ E06B 3/677 |
|           |   |   |         |           | 52/204.6           |
| 7,845,142 | B2| * | 12/2010 | Theios    | ...................... E06B 3/64 |
|           |   |   |         |           | 52/204.6           |
| 8,683,775 | B1| * | 4/2014  | Jones     | ...................... E06B 3/585 |
|           |   |   |         |           | 52/786.13          |
| 8,863,440 | B1| * | 10/2014 | Champlin  | ................ E05G 1/026 |
|           |   |   |         |           | 52/204.53          |
| 9,255,439 | B2| * | 2/2016  | Goossens  | ............... E06B 3/5892 |
| 9,447,627 | B2| * | 9/2016  | Thompson  | .............. E06B 3/221 |
| 9,752,375 | B2| * | 9/2017  | Jones     | .................... E06B 3/585 |
| 9,803,959 | B2| * | 10/2017 | Scarinci  | .................... F41H 5/013 |
| 10,030,434| B1| * | 7/2018  | Plummer   | .............. E06B 3/5481 |
| 10,087,635| B2| * | 10/2018 | Mucha     | ...................... E04B 7/18 |
| 10,267,086| B2| * | 4/2019  | Vander Bent | .......... E06B 5/103 |
| 10,415,302| B2| * | 9/2019  | Vander Bent, Jr. | ... E06B 3/5409 |
| 10,519,710| B2| * | 12/2019 | Abe       | ...................... E06B 3/6612 |
| 10,597,933| B2| * | 3/2020  | Abe       | ...................... E06B 3/6775 |
| 10,641,033| B2| * | 5/2020  | Lambertini| ............... E06B 7/22 |
| 10,829,983| B2| * | 11/2020 | Haba      | ...................... E06B 3/549 |
| 10,900,279| B2| * | 1/2021  | Chorine   | ...................... E06B 3/025 |
| 10,982,484| B2| * | 4/2021  | Bernhagen | .......... E06B 3/66309 |
| 11,187,027| B2| * | 11/2021 | Hasegawa  | ............... E06B 3/663 |
| 2007/0032972| A1| * | 2/2007 | Glover    | ................ B29C 65/7841 |
|           |   |   |         |           | 702/77             |
| 2008/0256896| A1| * | 10/2008| Lisec     | ........ E06B 3/56 |
|           |   |   |         |           | 52/786.1           |
| 2009/0324858| A1|   | 12/2009| Jaeger    |                    |
| 2010/0186641| A1| * | 7/2010 | Hay, III  | .................... E06B 5/12 |
|           |   |   |         |           | 109/76             |
| 2012/0137607| A1| * | 6/2012 | Kristensen| .......... E04D 13/0354 |
|           |   |   |         |           | 52/204.62          |
| 2013/0101759| A1| * | 4/2013 | Jones     | .................... E06B 3/6612 |
|           |   |   |         |           | 428/34             |
| 2014/0007396| A1| * | 1/2014 | Jones     | ...................... E06B 3/585 |
|           |   |   |         |           | 29/428             |
| 2014/0069034| A1| * | 3/2014 | Jones     | ...................... E06B 3/585 |
|           |   |   |         |           | 52/204.593         |
| 2014/0072735| A1| * | 3/2014 | Jones     | ...................... E06B 3/5814 |
|           |   |   |         |           | 428/34             |
| 2014/0260066| A1| * | 9/2014 | Riglos    | ...................... E06B 3/549 |
|           |   |   |         |           | 52/704             |
| 2014/0326126| A1| * | 11/2014| Hay, III  | .................... E06B 5/10 |
|           |   |   |         |           | 89/36.04           |
| 2015/0218877| A1| * | 8/2015 | Kawahara  | ................ B32B 7/05 |
|           |   |   |         |           | 428/34             |
| 2015/0345207| A1| * | 12/2015| Thompson  | .............. E06B 3/677 |
|           |   |   |         |           | 52/204.6           |
| 2017/0002599| A1| * | 1/2017 | Thompson  | .............. E06B 3/5454 |
| 2017/0268285| A1| * | 9/2017 | Abe       | ...................... C03C 27/10 |
| 2021/0054680| A1| * | 2/2021 | Benes     | ...................... E06B 3/56 |
| 2021/0071465| A1| * | 3/2021 | Middleton | .............. E06B 3/5892 |
| 2022/0065026| A1| * | 3/2022 | Özden     | .............. E06B 3/5454 |
| 2022/0243527| A1| * | 8/2022 | Abe       | ...................... E06B 3/6775 |
| 2022/0333376| A1| * | 10/2022| Wu        | ...................... E06B 3/5454 |

FOREIGN PATENT DOCUMENTS

| CN | 106760122 A   |   | 5/2017  |              |
|----|---------------|---|---------|--------------|
| CN | 112576149 A   | * | 3/2021  |              |
| CN | 113738228 A   | * | 12/2021 |              |
| DE | 3202639 A1    |   | 8/1983  |              |
| DE | 19742742 A1   | * | 4/1999  | .............. E06B 3/62 |
| DE | 19847634 C1   | * | 2/2000  | .............. E04B 1/803 |

(56) References Cited

FOREIGN PATENT DOCUMENTS

| | | | |
|---|---|---|---|
| DE | 20109728 U1 * | 10/2001 | ............. E06B 3/549 |
| DE | 10034889 A1 * | 2/2002 | ........... E06B 3/5427 |
| DE | 102006020455 A1 | 6/2007 | |
| DE | 202009016113 U1 | 5/2011 | |
| DE | 202012006687 U1 * | 12/2013 | ............... E05C 1/04 |
| DE | 202014001297 U1 * | 4/2014 | ........... E06B 3/5481 |
| DE | 10201400186 A1 | 2/2016 | |
| DE | 202016100768 U1 * | 4/2016 | ............... E06B 3/06 |
| DE | 202021104710 U1 * | 1/2022 | |
| DE | 202020107359 U1 * | 4/2022 | |
| EP | 0418461 A1 | 3/1991 | |
| EP | 0421239 A2 | 4/1991 | |
| EP | 0472109 A2 | 2/1992 | |
| EP | 1298100 A1 * | 4/2003 | ............. C03C 27/06 |
| EP | 1298100 A1 | 4/2003 | |
| EP | 1908914 A1 | 4/2008 | |
| EP | 2169172 A2 | 3/2010 | |
| EP | 2426304 A1 * | 3/2012 | ............... E06B 3/54 |
| EP | 2642060 A1 * | 9/2013 | ......... E06B 3/26301 |
| EP | 2921632 A1 | 9/2015 | |
| EP | 3101195 A1 | 12/2016 | |
| EP | 3124733 A1 | 2/2017 | |
| EP | 3170799 A1 | 5/2017 | |
| EP | 3396097 A1 * | 10/2018 | |
| FR | 2514057 A1 | 4/1983 | |
| FR | 2746843 A1 * | 10/1997 | ............... E06B 3/54 |
| FR | 2823789 A1 | 10/2002 | |
| FR | 2942843 A1 | 9/2010 | |
| GB | 2051197 A * | 1/1981 | ........... E06B 3/5409 |
| GB | 2228034 A * | 8/1990 | ............... E06B 3/24 |
| GB | 2259323 A * | 3/1993 | ........... E06B 3/5409 |
| GB | 2284634 A * | 6/1995 | ........... E06B 3/5821 |
| GB | 2297994 A * | 8/1996 | ............... E06B 1/38 |
| GB | 2306996 A * | 5/1997 | ........... E06B 3/5409 |
| GB | 2432858 A * | 6/2007 | ............... E06B 3/62 |
| GB | 2492380 A | 1/2013 | |
| GB | 2521419 A | 6/2015 | |
| GB | 2548605 A * | 9/2017 | ............... E06B 3/54 |
| GB | 2552902 A * | 2/2018 | ........... E06B 3/5481 |
| GB | 2585618 A * | 1/2021 | ............. E06B 3/549 |
| JP | 2000064732 A | 2/2000 | |
| JP | 2001146881 A | 5/2001 | |
| JP | 2002021437 A | 1/2002 | |
| JP | 2007132637 A | 5/2007 | |
| KR | 20180128659 A | 12/2018 | |
| NL | 1022030 C2 * | 6/2004 | ............... E06B 3/54 |
| SE | 9101266 A * | 10/1991 | ............... E06B 3/26 |
| SE | 9603628 A * | 4/1997 | ............... E06B 3/54 |
| WO | WO-9822686 A1 * | 5/1998 | ........... E04D 13/031 |
| WO | WO-9914169 A1 * | 3/1999 | ............. C03C 27/06 |
| WO | WO-2006002270 A1 * | 1/2006 | ............... E06B 3/24 |
| WO | 2014039642 A1 | 3/2014 | |
| WO | 2014183606 A1 | 11/2014 | |
| WO | 2015183863 A1 | 12/2015 | |
| WO | WO-2015200614 A1 * | 12/2015 | ............... E04B 2/90 |
| WO | 2017210701 A1 | 12/2017 | |
| WO | WO-2018062124 A1 * | 4/2018 | ............. C03C 27/06 |
| WO | WO-2020147904 A1 * | 7/2020 | ......... E04D 13/0351 |
| WO | WO-2020147905 A1 * | 7/2020 | ......... E04D 13/0351 |
| WO | WO-2020147906 A1 * | 7/2020 | ......... E04D 13/0351 |
| WO | WO-2020147907 A1 * | 7/2020 | ......... E04D 13/0351 |
| WO | WO-2020147908 A1 * | 7/2020 | ......... E04D 13/0315 |

OTHER PUBLICATIONS

International Search Report for corresponding application PCT/DK2020/050009 filed Jan. 13, 2020; dated Mar. 30, 2020.
International Search Report for corresponding application PCT/DK2020/050010 filed Jan. 13, 2020; dated Mar. 25, 2020.
International Search Report for corresponding application PCT/DK2020/050011 filed Jan. 13, 2020; dated Apr. 7, 2020.
International Search Report for corresponding application PCT/DK2020/050012 filed Jan. 13, 2020; dated Apr. 9, 2020.
International Search Report for corresponding application PCT/DK2020/050013 filed Jan. 13, 2020; dated Mar. 19, 2020.
International Search Report for corresponding application PCT/DK2020/050014 filed Jan. 13, 2020; dated Apr. 14, 2020.
International Search Report for corresponding application PCT/DK2020/050015 filed Jan. 13, 2020; Report dated Mar. 27, 2020.
International Search Report for corresponding application PCT/DK2020/050016 filed Jan. 13, 2020; dated Apr. 1, 2020.
International Search Report for corresponding application PCT/DK2020/050017 filed Jan. 13, 2020; dated Feb. 18, 2020.
International Search Report for corresponding application PCT/DK2020/050018 filed Jan. 13, 2020; dated Feb. 18, 2020.
Written Opinion for corresponding application PCT/DK2020/050008 filed Jan. 13, 2020; dated Apr. 3, 2020.
Written Opinion for corresponding application PCT/DK2020/050009 filed Jan. 13, 2020; dated Mar. 30, 2020.
Written Opinion for corresponding application PCT/DK2020/050010 filed Jan. 13, 2020; dated Mar. 25, 2020.
Written Opinion for corresponding application PCT/DK2020/050011 filed Jan. 13, 2020; dated Apr. 7, 2020.
Written Opinion for corresponding application PCT/DK2020/050012 filed Jan. 13, 2020; dated Apr. 9, 2020.
Written Opinion for corresponding application PCT/DK2020/050013 filed Jan. 13, 2020; dated Mar. 19, 2020.
Written Opinion for corresponding application PCT/DK2020/050014 filed Jan. 13, 2020; dated Apr. 14, 2020.
Written Opinion for corresponding application PCT/DK2020/050015 filed Jan. 13, 2020; Report dated Mar. 27, 2020.
Written Opinion for corresponding application PCT/DK2020/050016 filed Jan. 13, 2020; dated Apr. 1, 2020.
Written Opinion for corresponding application PCT/DK2020/050017 filed Jan. 13, 2020; dated Feb. 18, 2020.
Written Opinion for corresponding application PCT/DK2020/050018 filed Jan. 13, 2020; dated Feb. 18, 2020.

* cited by examiner

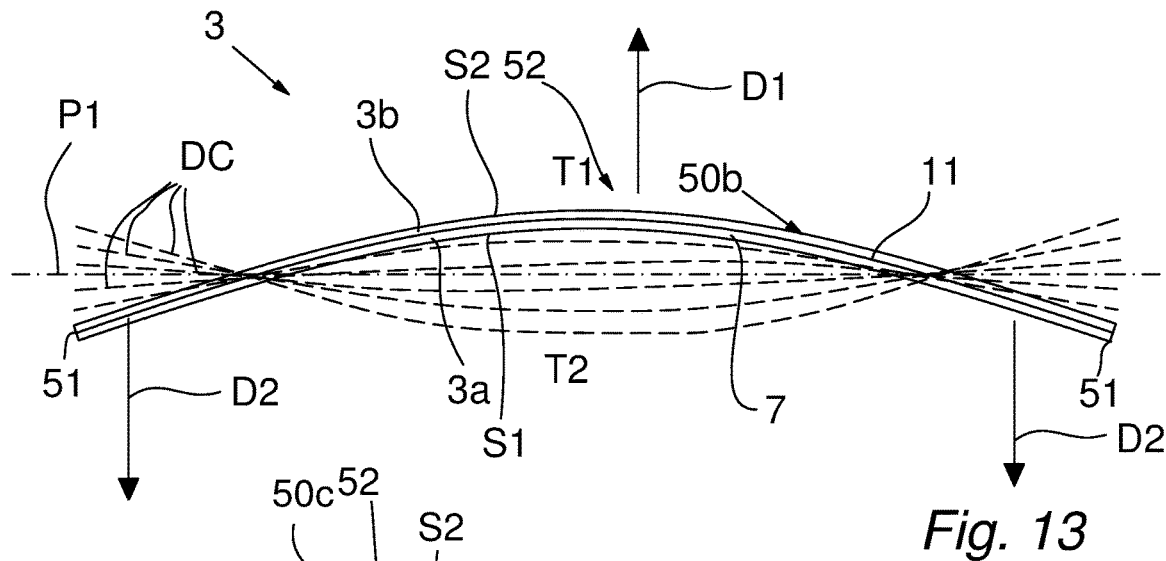
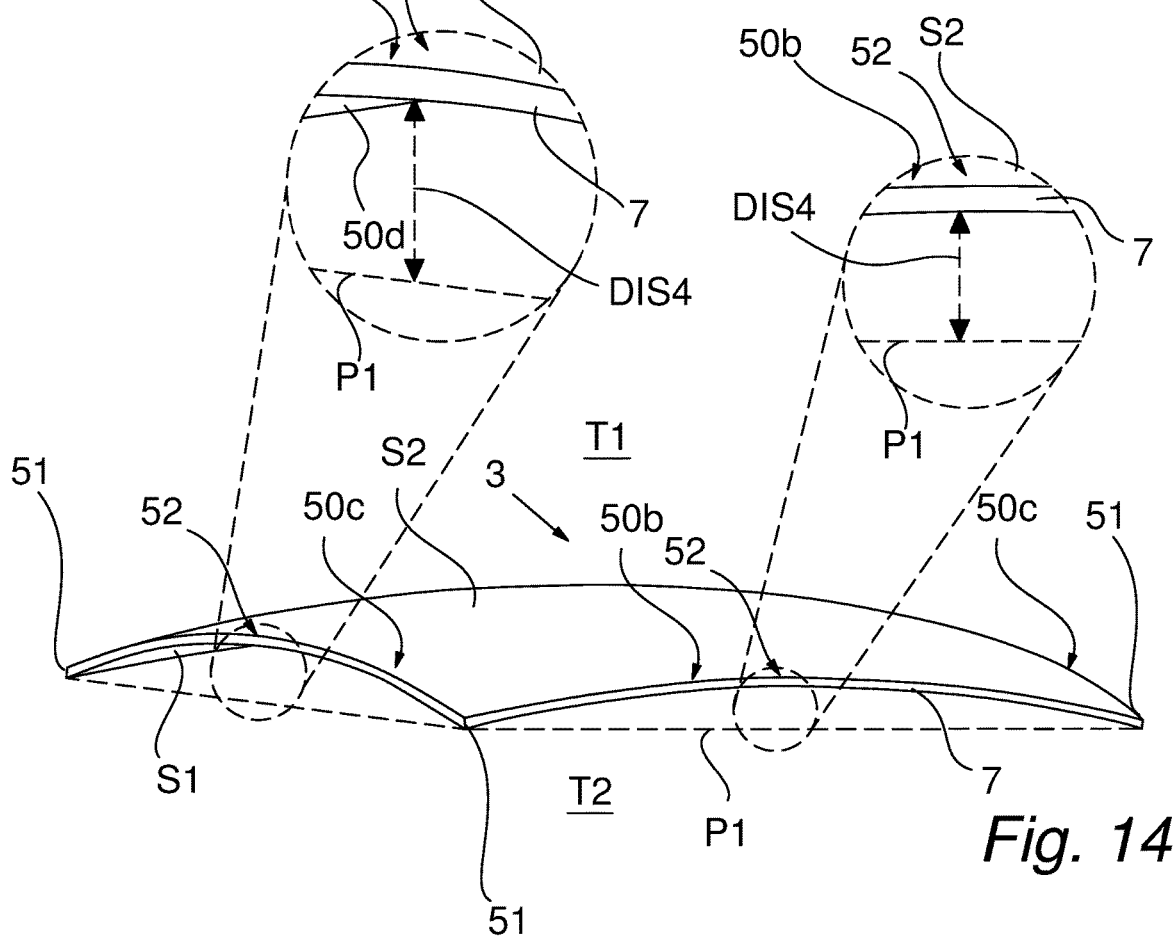
Fig. 13
Fig. 14

BUILDING APERTURE COVER WITH VIG UNIT CONNECTED TO FIXATION PROFILE

The present disclosure relates to an aperture covering, such as a building aperture covering, for example a window or a door. Additionally, the present disclosure relates to a building, such as a habitat building or an office building comprising one or more aperture covers. Furthermore, the present disclosure relates to a vacuum insulated glass unit comprising one or more fixation profiles.

BACKGROUND

Vacuum insulated glass (VIG) units provides several advantages such as good heat insulation properties and reduced thickness. A VIG unit may typically comprise glass sheets kept separated by support structures arranged in an airtight and evacuated gap between the glass sheets. To provide an airtight gap, an edge sealing is applied along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing.

Patent document U.S. Pat. No. 9,447,627B2 discloses a window frame unit for vacuum insulated glass unit. A base member and a glazing member of a frame provides a recess wherein a distal edge of a VIG unit is arranged. The recess is disclosed to be designed to accommodate distortion of the VIG unit rather than constraining the VIG unit at the distal edge of the VIG unit. This is obtained by a resilient, flexible tab of a glazing member that is/are snapped into engagement with a base member of the frame, so that the tabs may allow the glazing member to pivot to accommodate distortion of the VIG unit. Patent documents U.S. Pat. No. 6,435,630B1 and JP2007132637 discloses other solutions for holding a VIG unit. Patent document EP2169172 B1 discloses a further solution where a frame holds a VIG unit by means of an adhesive at a surface facing a sash. US2012137607 discloses a window frame and a possible VIG where the pane is moulded in an element.

It however appears that problems still exists when arranging a VIG unit in a frame to provide a window or door for e.g. covering building apertures.

The present disclosure provides one or more solutions where a VIG unit is arranged in a frame, which may e.g. help to improve or ensure the lifetime, such as the estimated lifetime, of the VIG unit, provide a more simple solution for holding a VIG unit in/at a frame, provide a solution that may be used and perform under varying climatic conditions, and/or provide a solution which is advantageous from a manufacturing point of view.

SUMMARY

VIG units are normally made from glass sheets kept separated by support structures such as pillars arranged in an airtight and evacuated gap between the glass sheets. To provide the airtight gap, an edge sealing is provided along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing. The edge seal may alternatively be made from a metal seal which is heated to a melting point and then cooled to cure.

The gap(s) between the glass sheets are normally evacuated by means of an evacuation cup connected to an evacuation pump, and the evacuation cup is arranged to cover an evacuation hole in one of the glass sheets for the VIG unit, which is then sealed after the evacuation of the gap. Alternatively, the gap may be evacuated in an evacuation chamber enclosing the entire VIG unit. The gap is normally evacuated to below $10^{-3}$ bar, such as below $10^{-4}$ bar, e.g. to about or below $10^{-3}$ mbar.

The VIG unit is subjected to significant temperature differences $\Delta T$ between the VIG unit glass sheets due to the good insulation capabilities of the VIG unit. As the edge seal for sealing the gap between the VIG unit glass sheets is normally very stiff in nature, the temperature difference $\Delta T$ between the glass sheets causes the VIG unit to deflect (also known as thermal bending, thermal deflection or thermal distortion), as the hotter glass sheet of the VIG unit will expand compared to the colder of the glass sheets.

VIG units according to aspects of the present disclosure may in aspects of the present disclosure provide a $U_g$-value at or below 0.7 W/(m²K), such as at or below 0.6 W/(m²K), e.g. at or below 0.5 W/(m²K) such as below 0.4 W/(m²K), and such VIG units may suffer from increased thermal deflection due to the good insulation provided by means of the VIG unit. This low $U_g$-value may be obtained by means of the evacuation of the gap between the VIG glass sheets, e.g. in combination with one or more one or more of

- One or more low-e coatings such as thin tin dioxide or thin silver layers or any other suitable low e-coating layers at e.g. the inner surface(s) of the glass sheets of the VIG unit facing the VIG unit gap,
- a larger/increased support structure distance, such as above 3 or above 4 centimetres, for example above 5 centimetres, between neighbouring support structures in the VIG unit gap to reduce the number of potential "cold-bridges" provided by the support structures,
- by using support structures of a material having a low thermal conductivity and/or a small size,
- By providing a 3-layer VIG unit (i.e. with two evacuated gaps placed between a middle glass sheet and a glass sheets arranged at and parallel to opposite surfaces of the middle glass sheet)
- By providing a hybrid VIG unit comprising a first evacuated gap between first and second glass sheets and a second gas filled gap between the second glass sheet and a further glass sheet.

It is understood that the support structures may generally be arranged in a repeated pattern such as a grid with parallel rows and columns having substantially the same distance between neighbouring support structures. In other aspects of the present disclosure, the support structures may be arranged in a pattern that has been determined/adapted based on a predetermined stress profile. This stress profile may e.g. be established by means of tests and/or computer simulations of a VIG unit. In this case, the distance between neighbouring support structures may be different at certain areas of the VIG unit across the VIG unit. For example so that there is a larger distance between some neighbouring support structures where the stress conditions are lower, and possibly a higher number of support structures where the stress conditions may be, or potentially become, higher.

The present disclosure relates, in a first aspect, to an aperture covering, such as a building aperture covering. The aperture covering comprises a vacuum insulated glass unit comprising a first glass sheet and a second glass sheet, wherein an evacuated gap is placed between the first and second glass sheets. A plurality of support structures are distributed in the evacuated gap, and an edge seal seals the evacuated gap. The aperture covering moreover comprises a frame enclosing a frame opening, and elongated fixation profiles each of which are fixed to and arranged parallel to an elongated structural frame member. Each elongated fixation profile comprises a fixation wall which extends opposite to an exterior major surface of the vacuum insulated glass unit and is fixed to the exterior major surface of the vacuum insulated glass unit by means of a bonding seal. The fixation profile comprises a connection member extending from the fixation wall, and the connection member is fixed to the elongated, structural frame member. The elongated structural member may face the outer, opposite interior major surface of the vacuum insulated glass unit placed opposite to the outer exterior major surface of the vacuum insulated glass unit.

Aperture coverings such as a doors or windows comprising vacuum insulated glass (VIG) units provides good insulating capabilities compared to more conventional gas filled units, in a space saving way. However, VIG units may have some inherent characteristics, which are not present in gas-filled units.

The present disclosure may for example help to provide a simple and space saving construction which also enables easy assembling of the aperture cover, and which may as well enable more easy exchange/replacement of the VIG unit in the frame, if needed as well as enhance the recycle properties of the product. The present disclosure enables providing a space saving solution with good heat insulation properties which may help to enable an increased inflow of visible light through the VIG unit when compared to the space consumption of the aperture covering and the frame.

The fixation profile may additionally help to provide a weatherproof and long lasting, reliable and structurally strong solution.

In one or more aspects of the present disclosure, the connection member may overlap an edge surface of the vacuum insulated glass unit. This may help to provide a space saving solution and also help to provide an increased mechanical protection of the VIG unit edges.

It is moreover understood that the fixation profile may help to provide a safety backup as the fixation wall extends in over the exterior surface of the VIG unit.

In aspects of the present disclosure, the connection member of the fixation profile may provide an outermost surface of the frame facing away from the VIG unit edge, and hence, also at least partly help to provide a guide for drainage of water such as rainwater and/or dew on the frame.

In one or more aspects of the present disclosure, the bonding seal is a flexible, elongated adhesive sealing stripe bonding to the exterior major surface of the vacuum insulated glass unit and to a surface of the fixation wall facing the exterior major surface of the VIG unit.

This may help to provide a mechanically simple fixation solution that also may help to provide an improved water tightness over time.

In one or more aspects of the present disclosure, the bonding seal may have a width of between 2 mm and 30 mm, such as between 3 mm and 15 mm, for example between 4 mm and 13 mm. This may help to enable a sufficient bonding of the VIG to the frame, and may help to enable a bonding solution that can last over time.

In one or more aspects of the present disclosure, wherein the bonding seal has a width below 15 mm, for example below 10 mm or below 6 mm.

This provide a solution that may provide sufficient fixation of the VIG unit edge, also in case of thermal deflection of the VIG unit edge caused by temperature differences. At the same time, it may help to provide a solution that enables providing an aperture covering having desired aesthetic appearance and/or helps to handle stress conditions in the VIG unit due to thermal deflection of the VIG unit.

In one or more aspects of the present disclosure, said bonding seal may include or be a structural adhesive.

The structural adhesive helps to provide a sufficient fixation of the VIG unit in the frame. Additionally, it may enable handling VIG unit edge deflections over time due to thermal deflection of the VIG unit edge.

In one or more aspects of the present disclosure, the structural adhesive may be or comprise a silicon adhesive, a silane-terminated polyurethane (SPUR) adhesive or a Modified-Silyl Polymer (SMP) adhesive.

In one or more aspects of the present disclosure, the bonding seal has a thickness above 4 mm, such as about or above 6 mm, such as above 8 mm, wherein the thickness is determined in a direction perpendicular to the exterior major surface (S1) at a temperature difference between the glass sheets ($3a$, $3b$) of the VIG unit of substantially 0° C.

This may help to provide a solution that is capable of handling VIG unit edge deflections over time due to thermal deflection of the VIG unit edges. The bonding seal may be compressed and stretched by the VIG over time, and this thickness of the bonding seal may help to provide a bonding seal solution that can last and cope the thermal deflections of the VIG unit in the area of the bonding seal.

For example, in one or more aspects of the present disclosure, the bonding seal may have a thickness between 4 mm and 30 mm, such as between 4 mm and 15 mm, such as between 4 mm and 10 mm. For example, the bonding seal thickness may be between 5 mm and 10 mm or between 6 and 10 mm. This thickness is determined in a direction perpendicular to the exterior major surface at a temperature difference between the glass sheets of the VIG unit of substantially 0° C.

The thickness may be substantially the same for at least 70% of the length of the bonding seal, such as for at least 90% of the length of the bonding seal, determined at a temperature difference between the VIG unit glass sheets enclosing the gap of substantially 0° C.

This thickness may help to provide a solution that can handle and withstand the thermal deflection of the VIG unit's edges over time, and allow the edge to describe an edge deflection curve between the corners where the respective edge terminates.

In one or more aspects of the present disclosure, the bonding seal may be arranged to bond to the exterior major surface so that the bonding seal material is terminated before and does not extend to the edge surface of the vacuum insulated glass unit.

The edges of the VIG unit, especially in the case of a rigid edge seal, provides an edge deflection curve in case of that the VIG unit is subjected to temperature differences between the glass sheets enclosing the evacuated gap. Here, the VIG edge describes a curve between the corners of the respective edge, and this curve is described relative to a plane defined between the corners of the VIG unit where the edges terminates (the plane is defined at a temperature difference of approx. 0° C.). This bonding seal solution may thus help to provide a more reliable, resistant and long lasting bonding seal solution as the bonding seal material is kept away from bonding to the VIG unit's edge surfaces, and hence the bonding seal material needs to be subjected to forces from the edge deflection in less/fewer directions, and may thus be better capable of handling the varying deflection along the VIG unit edge due to the edge deflection curve.

In one or more aspects of the present disclosure, the bonding seal may be located to partly or fully lap over an edge seal of the vacuum insulated glass unit.

This may help to enable providing a space saving frame solution and/or a solution where more force is transferred directly to the edge sealing in case of thermal edge deflection, and/or objects or wind striking the VIG unit.

However, it is understood that in in other aspects of the present disclosure, the bonding seal may at least partly be arranged opposite to the evacuated gap, or be kept away from the area of the exterior major surface that is arranged opposite to the edge seal.

In one or more aspects of the present disclosure, the evacuated gap of the VIG unit may overlaps the elongated structural member.

This provides a solution with improved heat insulating capabilities, as heat transmission through the edge seal enclosing the evacuated gap is kept away from the frame opening and the "line of sight" through the aperture cover.

In one or more aspects of the present disclosure, the evacuated gap overlaps the elongated structural member by between 15 mm and 100 mm, such as between 25 mm and 80 mm, such as between 30 mm and 70 mm. Here the overlapping distance is determined parallel to a plane defined by an outer major surface of the vacuum insulated glass unit and is determined from the inner surface of the edge seal facing the evacuated gap, and to a line of sight through the vacuum insulated glass unit and the frame opening.

Especially rigid, fused edge seals such as solder glass or metal solder edge seals may provide an undesired high heat transfer at the edge area of the VIG unit. By providing an overlapping of the elongated structural member according to the above, water condensation formation at the interior surface of the VIG near the line of sight through the VIG unit in the frame can be reduced or even substantially avoided. The present disclosure enables a space saving solution with structural advantages and an overall improved insulation characteristic of the aperture covering.

In one or more aspects of the present disclosure, at least the fixation wall of the fixation profile may comprise a metal surface, wherein the bonding seal is attached to said metal surface. A metal surface may provide advantages in relation to enable providing a long lasting and strong bonding between the fixation wall and the VIG unit.

In one or more aspects of the present disclosure, said fixation profile may be a metal profile. Even though metal such as steel or aluminium has advantages, such as strength and may provide good connection options for a bonding seal, it also has a (in e.g. windows and doors often undesired) high thermal conductivity. However, providing that the metal profile is fixed/attached to the elongated, structural frame member arranged to face the exterior major surface of the VIG unit which is to face the building interior, this may help to provide a reduced thermal conductivity towards the interior of the building. A metal profile may also provide an increased strength of the fixation profile.

In one or more aspects of the present disclosure, the metal profile is an aluminium profile, such as an extruded, pultruded or roll formed aluminium profile. Aluminium may be advantageous to use when using a bonding seal such as a structural adhesive. A profile made from aluminium may be cost efficient, light weight, and provide strength and/or good connection properties for a bonding seal.

In one or more aspects of the present disclosure, said metal profile may be an aluminium profile comprising at least 70% by weight aluminium, such as at least 90% by weight aluminium, for example at least at least 98% by weight aluminium.

Extrusion, pultrusion or roll forming may be advantageous manufacturing methods that have shown to be reliable and may be cost efficient.

Alternatively, in other aspects where the fixation profile is a metal profile, it may e.g. be a steel profile such as a stainless steel alloy profile or a copper profile.

In further aspects of the present disclosure, the fixation profile 6 may be a profile comprising or made from a plastic material such as a PVC or PUR material, or a composite material such as a fibre-reinforced composite plate material. This may e.g. help to provide a solution with lower thermal conductivity.

In one or more aspects of the present disclosure, the fixation wall and/or the connection member of the fixation profile is/are a substantially solid, single walled construction.

In one or more additional or alternative aspects of the present disclosure, the fixation profile is provided in a single walled plate material such as a metal plate material, a plastic plate material or a composite plate material such as a fibre-reinforced composite plate material. This may help to provide a space saving and simple construction of the frame that may also have desired structural and/or aesthetic properties. However, the fixation profile may also in further aspects comprise cavities between two or more walls.

In one or more aspects of the present disclosure, the fixation wall and/or the connection member may have a thickness that is less than 10 mm, such as less than 5 mm, for example about or less than 2 mm, such as about or less than 1 mm. This may provide a space saving solution that may also enable providing an aperture cover with a desired aesthetic appearance.

In one or more aspects of the present disclosure, the thickness of the part of the connection member overlapping the edge surface of the vacuum insulated glass unit (3) may be between 0.5 mm and 5 mm, such as between 0.8 mm or 1 mm and 3 mm.

This may help to provide a frame solution that has desired structural properties in a space saving manner.

In one or more aspects of the present disclosure, the fixation wall of the fixation profile may extend no more than 50 mm, such as no more than 30 mm, for example no more than 20 mm or no more than 10 mm in over the exterior major surface of the VIG unit from the edge of the vacuum insulated glass unit. This may help to provide an solution that enables an increased exposing of the exterior major surface of the VIG unit, and/or a more space saving frame solution that may be made thinner as it may thus need to only handle/cover a reduced part of the exterior VIG unit surface deflecting due to thermal deflection.

In one or more aspects of the present disclosure, the elongated structural member overlaps the opposite interior major surface of the vacuum insulated glass unit with a larger overlapping distance than the overlapping distance with which the fixation wall overlaps the exterior major surface of the VIG unit.

This may provide improved heat insulation capabilities combined with desirable outer visual appearance where a larger part of the VIG unit surface may be exposed. And since a VIG unit is slim when compared to it's heat insulation properties this may help to allow less obstruction of the view out through the window and a better user experience.

In one or more aspects of the present disclosure, the elongated structural member may overlap the opposite interior major surface of the vacuum insulated glass unit with an at least 5% larger, such as at least 10% larger, for example an at least 20% larger overlapping distance than the overlapping distance with which the fixation wall (6a) overlaps the exterior major surface.

In one or more aspects of the present disclosure, the elongated structural member may overlap the opposite interior major surface of the vacuum insulated glass unit with an overlapping distance, where this overlapping distance is at least 25 mm, such as at least 35 mm, such as at least 50 mm. The overlapping distance of the elongated structural member may be below 100 mm, such as below 70 mm, for example below 50 mm. This may help to provide sufficient heat insulation capabilities of the aperture covering while enlarging the inflow of light through the VIG unit and frame opening.

In one or more aspects of the present disclosure, the elongated structural member may overlap the opposite interior major surface of the vacuum insulated glass unit with an overlapping distance DIS2, wherein the ratio (DIS2/LEL) between said overlapping distance DIS2 and the length of the longest edge LEL of the vacuum insulated glass unit is at least 0.015 such as at least 0.017, for example at least 0.018.

This may help to significantly reduce the risk of condensation on the interior surface of the VIG unit that is visible through the frame opening, and at the same time help to provide a deflection space in the frame for the VIG unit edge in order to allow a more free thermal deflection of the VIG unit in the frame between the fixation wall and the overlapped structural member.

In one or more aspects of the present disclosure, the connection member and the fixation wall may together provide (substantially) an angle bracket shape, such as substantially an L-shape, when seen in a plane which extends perpendicular to the longitudinal direction of the fixation profile.

This provides a simple, space saving and cost efficient solution that may be efficient to produce and assemble.

This may moreover provide a solution where the fixation profile may not necessarily comprise parts and/or a wall, such as a metal part or wall extending in between the elongated, structural member and the interior major surface of the vacuum insulated glass unit. This may be advantageous in order to improve heat insulation capabilities.

The fixation profile may in aspects of the present disclosure be an L-shaped, elongated profile.

In one or more aspects of the present disclosure, the connection member of the fixation profile may be fixed to the elongated, structural member by means of one or a plurality of mechanical fasteners such as one or more of a snap connection, positive engagement like a tongue and groove configuration, screws, nails or pop rivets.

Mechanical fasteners enables easy assembling during manufacturing, and moreover more easy replacement of a VIG unit if needed and/or help to enhance recycling properties of the aperture cover. It may also enable a solution where the fixation profile may be pre-mounted under controlled conditions to the VIG unit so that a VIG unit can be supplied to the relevant location such as a manufacturing facility or a building where a VIG needs to be replaced, and here already comprise the fixation profile thereby enabling an easy and more user friendly installation of the VIG unit. This may help to provide improved manufacturing options and/or reduce the risk of erroneous installation of the VIG unit.

The connection member may in further aspects, if screws, pop rivets and/or nails are used, comprise holes, recesses and/or slits for receiving such mechanical fasteners. Alternatively, the mechanical fasteners may be forced to penetrate the connection wall when attaching the VIG unit to the structural elongated member of the frame.

The connection member additionally also or alternatively, in further aspects, be fixed to the elongated, structural member by means of a chemical fastener such as a glue.

Preferably, the fastener may not be accessible from the outside of the aperture covering, at least when the aperture covering is closed in case the frame is a sash that can be opened, due to the risk of burglary in case the frame assembly is a window or a door to be arranged in an exterior wall or roof structure of a building. The mechanical fasteners may hence be hidden in a frame construction when the sash is closed.

In aspects of the present disclosure, said connection member of the fixation profile may be an elongated connection wall. This may help to provide a desired structural rigidity of the fixation profile and/or an improved and simple water protection construction.

In one or more aspects of the present disclosure, the elongated structural frame member comprises an inner side surface facing the frame opening, and an opposing outer side surface, and the edge surface of the vacuum insulated glass unit may be arranged so that it is terminated before and hence does not extend beyond the outermost part of the outer side surface of the overlapped structural member.

This may help to improve part tolerances, and/or handling thermal deflection of the VIG unit. Additionally, it may protect from handling impacts and allows water/condensation to drain away from the VIG edge in a more controlled way.

The vacuum insulated glass unit may In aspects of the present disclosure overlap at least 60%, such as at least 80%, such as at least 95% of the largest width of the elongated, structural frame member, wherein said largest width is measured in a direction parallel to a major surface of the VIG unit, and in a direction perpendicular to the longitudinal direction of the elongated, structural frame member.

This enables providing a frame solution with improved thermal insulation as the VIG edge is moved away from the frame opening. Also, it may help to improve water drainage.

In one or more aspects of the present disclosure, the bonding seal and fixation profiles may carry the majority of the weight of the vacuum insulating glass unit. For example, in embodiments of the present disclosure, the bonding seal and fixation profile may carry at least 60%, for example at least 70%, such as at least 90% of the weight of the vacuum insulating glass unit when the aperture cover is installed. This may help to provide a solution where selection of sealing solutions for sealing between the interior major surface and the elongated structural member is larger. Accordingly, an improved sealing and/or insulating solution may be obtained at the interior major surface of the VIG unit between the VIG unit and the overlapped structural member.

This may also be advantageous in relation to protecting a resilient gasket strip between the overlapped elongated structural member and the interior VIG unit surface. For example, in windows such as roof window applications, The fixation profile(s) may carry the majority of the VIG unit weight and thereby provide a controlled compression of the gasket strips(s) at the interior surface of the VIG unit In one or more aspects of the present disclosure, a gasket strip, such as a resilient gasket strip, is arranged between the elongated structural member and the interior major surface.

This may help to provide a more simple mechanical solution which also helps to provide improved heat insulating performance and air-tightness of the frame, and helps to prevent condensation problems at the interior surface of the VIG unit.

The bonding seal fixing the exterior major surface of the VIG unit to the fixation wall may furthermore in some aspects help to protect the resilient gasket strip over time from pressure from the VIG unit, as the bonding seal and fixation profile in aspects of the present disclosure may be arranged to carry the majority of the weight of the VIG unit and keep it at a desired/predetermined distance from the elongated, structural member.

It is generally understood that the gasket strip and/or the bonding seal in aspects of the present disclosure may act as water sealants and hence, in aspects of the present disclosure, may extend substantially continuously and uninterrupted around the VIG unit to provide a seal between VIG unit and frame.

In case for example the bonding seal may be terminated at certain areas of the VIG unit so that it does not extend substantially continuously and uninterrupted around the VIG unit, but instead provides discrete areas along the VIG unit edges where the bonding seal is placed, a further gasket such as a rubber, elastomer and/or foam gasket may be placed to provide a water sealing between the VIG unit's outer surface and the frame. This gasket may be substantially similar to the sealing gasket arranged at the interior surface of the VIG unit.

In one or more aspects of the present disclosure, the gasket strip may be softer than the bonding seal at 20° C. In one or more aspects of the present disclosure, the gasket strip may be a rubber gasket, foam gasket or an elastomer gasket.

This may help to provide a solution with good and long lasting internal sealing capabilities between the VIG unit and the frame.

In one or more aspects of the present disclosure, the gasket strip may abut the elongated structural member and the interior major surface of the vacuum insulated glass unit. This may provide a simple and yet sufficiently efficient sealing solution.

In one or more aspects of the present disclosure, the gasket strip may have a height which is above 4 mm, such as above 5 mm or above 6 mm at a temperature difference ($\Delta T=T1-T2$) between the two glass sheets of the VIG unit that encloses the evacuated gap of substantially 0° C., and wherein said height is measured in a direction substantially perpendicular to the interior major surface.

A gasket strip of this height may be especially suitable for handing thermal deflection of the VIG unit. Preferably, the thickness of the gasket may be above 5 mm, such as above 6 or above 7 mm.

In one or more aspects of the present disclosure, the gasket strip may have a height between 4 mm and 30 mm, such as between 6 mm and 20 mm, for example between 5 mm and 15 mm, or such as between 9 mm and 18 mm at a temperature difference ($\Delta T=T1-T2$) between the two glass sheets of substantially 0° C.

The resilient gasket strip may in one or more aspects of the present disclosure be a pre-compressed and/or pre-deflected gasket strip.

Such gasket strips may enable improved handling of the VIG unit's thermal deflection when the edge describes a bending curve. This may help to ensure air tightness of the aperture covering between the VIG unit and the frame.

The elongated structural member may in one or more aspects of the present disclosure have a maximum width (W1) of between 25 mm and 100 mm, such as between 30 mm and 70 mm, for example between 35 mm and 50 mm.

In one or more aspects of the present disclosure, the vacuum insulated glass unit may be a laminated vacuum insulated glass unit comprising a lamination glass attached to the vacuum insulated glass unit by means of a lamination interlayer. In further aspects, the lamination glass may provide said interior major surface of the vacuum insulated glass unit.

Laminated VIG units provides a safety measure in case the VIG unit breaks due to e.g. external forces striking the VIG unit.

In one or more aspects of the present disclosure, said aperture covering may be a window such as a roof window. Here, the aperture covering may in further aspects comprise a cladding device which covers a part of the frame and at least a part of said vacuum insulated glass unit. The cladding device is arranged to guide rain water from the cladding device and towards a surface of the fixation profile and/or onto the exterior surface of the vacuum insulated glass unit when the window is installed in a building.

The cladding device provides improved drainage of rain water in order to assure water tightness of the overall frame construction over time.

The cladding device may in aspects be connected to a sash or a fixation frame of the window, or the window may comprise a first cladding device which is connected to the fixation frame and a second cladding device connected to the sash. In the case of a roof window, these cladding devices may be arranged in continuation of each other when the sash is in a closed position, and where one of the cladding devices are stationary whereas the other cladding device is movable together with the sash.

Said cladding device may in one or more aspects of the present disclosure be configured to guide rain water from the cladding device and towards a receipt part. This may provide a controlled and good water tightness of the aperture cover. The receipt part may for example be a channel provided at said aperture covering.

In one or more aspects of the present disclosure, said fixation profile may comprise an interface part, such as an elongated wall, which extends away from a plane defined by the exterior major surface of the vacuum insulated glass unit, and the interface part may interface with the cladding device.

This may provide a mechanically simple and yet improved solution for water tightness of the frame. In case the interface part is integrated in the fixation profile and e.g. extruded, pultruded or roll formed with the fixation wall and connection member, this may also provide a cost efficient and more simple frame construction.

In one or more aspects of the present disclosure, the cladding device may at least partly cover a part of at least one surface, such as a part of at least two surfaces, (of the interface part.

This may further improve water tightness of the frame.

In one or more aspects of the present disclosure, the cladding device at least partly covers an end part of the interface part, and moreover extends in over a side surface of the interface part which faces a second plane, wherein the second plane extends through the frame opening, and in a direction perpendicular to a first plane defined by the exterior major surface of the vacuum insulated glass unit, and wherein the second plane extends parallel to the longitudinal direction of the fixation profile and the overlapped structural member.

In one or more aspects of the present disclosure, the cladding device may be a plate shaped member fixed to the fixation frame, the sash and/or the exterior surface (S1).

In one or more aspects of the present disclosure, said aperture covering may be a window, such as a roof window, for covering an aperture in a building.

The roof window may e.g. be a pivot window such as a centre pivot roof window.

VIG unit may provide several advantages, such as improved heat insulation, when compared to windows comprising gas filled insulated glass units.

The present inventors have found that computer simulations revealed that in certain situations when a VIG unit is arranged in a roof window so that the major outer surfaces are not completely vertical, gravity acts on the VIG unit and may (try to) cause a further deflection of the edges of the VIG unit. This may in some situations add on to the already present thermal deflection of the VIG unit edges due to a temperature difference between the VIG units. Hence a "worse case" scenario may be if the hotter surface of the VIG unit is the interior VIG unit glass sheet surface (often a surface of a lamination glass sheet in roof windows), as both gravity and thermal deflection acts in the same deflection direction. The present disclosure may help to provide a solution that can cope such a situation.

In one or more aspects of the present disclosure, said frame may be a movable sash which is connected to a fixation frame by means of a displacement mechanism, such as one or more hinged connections, configured to allow the sash to move, such as at least rotate, relative to the fixed frame.

In advantageous aspects of the present disclosure, the displacement mechanism may be connected to the fixation profile and/or the overlapped structural member.

In one or more aspects of the present disclosure, said fixation frame may comprise elongated fixation frame members, and wherein the connection member of the fixation profile is configured to extend between the overlapped elongated structural member, and an elongated member fixation frame member of the fixation frame, at least when the sash is in a closed position.

This may provide a space saving solution which also provides enhanced insulating capabilities. Moreover, it may also provide a solution that may make the aperture cover more burglary resistant.

In embodiments of the present disclosure, said before mentioned elongated, structural members which the interior VIG unit major surface is arranged opposite to are part of a movable sash such as a top-hung sash or a centre pivot sash.

In one or more aspects of the present disclosure, the elongated structural frame member(s) comprises an inner side surface facing the frame opening, and an opposing outer side surface, and the connection member may be attached to the elongated structural frame member at the outer side, such as by abutting the outer side surface of the elongated structural frame member.

This may e.g. provide a solution which enables more easy exchange of the VIG unit in the frame, and also or alternatively, it may be advantageous with respect to reducing cold bridges in the frame construction, and reduce cold reaching the part of the VIG unit placed in/covering the frame opening.

In one or more aspects of the present disclosure, the frame is configured to allow the edges of the vacuum insulated glass unit to thermally deflect in response to a temperature difference between the glass sheets of the vacuum insulated glass unit.

In one or more aspects of the present disclosure, an edge seal extends around the periphery of the vacuum insulated glass unit and seals the evacuated gap, and wherein said edge seal comprises a glass material, such as a solder glass edge seal material, or a metal solder edge seal material.

It is noted that a rigid edge seal, such as a, so to say, fused edge seal provided from e.g. metal or glass based edge seal material, may provide an undesired high thermal conductivity through the edge seal material from the outwardly facing glass sheet to the glass sheet facing the interior of the building. However, The elongated, structural frame member can, as it is overlapped by and thus covers/faces the outer major surface of the vacuum insulated glass unit which is to face the interior of the building, also help to reduce thermal conduction of cold from the outside to the inside of the VIG unit through the VIG unit's edge seal, and hence help to provide a An aperture covering with improved, heat insulating capabilities, also at or near the frame.

In one or more aspects of the present disclosure, a further adhesive material, such as an adhesive tape, is placed between the fixation wall and the exterior major surface, and wherein the further adhesive material is fixed to at least one of the fixation wall and the exterior major surface of the vacuum insulated glass unit.

This adhesive tape (e.g. double sided foam tape, for example acrylic foam tape), may help to provide a support function during manufacturing while the bonding seal cures, and/or it may help to provide a further fixation of the VIG unit to the fixation profile, or provide improved insulating and/or protective capabilities.

In one or more aspects of the present disclosure, said bonding seal and/or said fixation profile is/are configured to allow the edges of the vacuum insulated glass unit to thermally deflect in response to a temperature difference ($\Delta T = T1 - T2$) between the glass sheets of the vacuum insulated glass unit.

Tests and computer simulations indicates that allowing the edges of the VIG unit to thermally deflect in response to a temperature difference $\Delta T = T1 - T2$ between the glass sheets of the vacuum insulated glass unit enclosing the evacuated gap May help reduce or improve critical stress conditions in the VIG unit such as at or near the edges and/or corners of the VIG unit.

In one or more aspects of the present disclosure, a largest allowed edge deflection in a deflection direction of any of the edges of the vacuum insulated glass unit, at a temperature difference between the two glass sheets of 65° C., as compared to the vacuum insulated glass unit at a temperature difference ($\Delta T$) of 0° C., may be at least 1 mm, such as in the range of 2 mm to 50 mm, preferably in the range of 1, 2 or 3 mm to 15 mm, or in the range of 2 to 10 mm, where the deflection direction is determined perpendicular to a plane which is defined by a major surface of the VIG unit at a temperature difference ($\Delta T$) between the glass sheets of the VIG unit of 0° C.

The bonding seal and/or the fixation profile may in aspects of the present disclosure, be configured to allow edges of the vacuum insulated glass unit to describe an edge deflection curve between corners of the vacuum insulated glass unit due to a thermal deflection of the vacuum insulated glass unit, where the edge deflection curve is provided in a direction perpendicular to a plane defined by an outer major surface of the vacuum insulated glass unit when the temperature difference between the glass sheets of the vacuum insulated glass unit is substantially 0° C.

Generally, the present inventors have found that the VIG unit provides an edge deflection curve when subjected to thermal deflection, where the edges describes a curve between the corners where the edge is terminated. The thermal deflection of the VIG unit provides, due to the evacuated gap, that the glass sheets of the VIG unit deflects in the same direction and one of the major surfaces of the VIG unit hence provides a convex shape whereas the other major surface will at the same time provide a concave shape when the VIG unit thermally deflects.

The fixation wall and/or the connection member may in aspects of the present disclosure be configured to flex in response to a thermal deflection of the vacuum insulated glass unit caused by a temperature difference between the glass sheets of the vacuum insulated glass unit.

The flexing of the fixation profile may in aspects of the present disclosure, at one or more locations of the fixation profile, be at least 1 mm, such as at least 2 mm, for example at least 4 mm in a direction perpendicular to a frame opening plane, when compared to when the vacuum insulated glass unit is subjected to a temperature difference ($\Delta T$) between the glass sheets of the VIG unit of substantially 0° C.

The bonding seal may in aspects of the present disclosure be configured to be further compressed and/or stretched in response to a thermal deflection of the vacuum insulated glass unit caused by a temperature difference ($\Delta T$) between the glass sheets of the vacuum insulated glass unit, thereby changing the thickness of the bonding seal at one or more locations along the fixation wall when compared to the thickness at the same one or more locations when the temperature difference ($\Delta T$) is substantially 0° C.

Hence, the bonding seal may be compressed and stretched, respectively, at different locations along the length of the VIG unit edge, in order to allow the VIG unit edge to describe an edge deflection curve caused by a temperature difference between the glass sheets of the VIG unit that encloses the evacuated gap.

In one or more aspects of the present disclosure, the frame is configured to partly restrict a thermal deflection of the edge of the vacuum insulated glass unit in response to a temperature difference ($\Delta T$) between the glass sheets of the vacuum insulated glass unit, when compared to a free, unrestricted thermal deflection of the vacuum insulated glass unit at substantially the same temperature difference ($\Delta T=T1-T2$).

In one or more aspects of the present disclosure, the largest total edge deflection of the edges of the VIG unit may be configured to be at least 10% smaller, such as at least 20% smaller, such as at least 30% smaller than the largest total edge deflection of the unrestricted vacuum insulated glass (VIG) unit at a temperature difference ($\Delta T=T1-T2$) of at least 40° C., such as about 65° C. This may be tested by determining the edge deflection in thermal edge deflection in the frame, and then subjecting the VIG unit, or a similar VIG unit to a similar temperature difference while unrestricted and allowed to provide a "free" thermal deflection.

This may e.g. help to enable an improved and space saving frame solution with sufficient air tightening capabilities, also in case of larger thermal deflections of the VIG unit.

In one or more aspects of the present disclosure, the bonding seal and/or the fixation profile, may be configured to partly restrict a thermal deflection of the vacuum insulated glass unit.

In one or more aspects of the present disclosure, the largest total edge deflection of any of the edges of the vacuum insulated glass unit at a temperature difference between the two glass sheets of 65° C. as compared to the vacuum insulated glass unit at a temperature difference of 0° C. is at least 0.3% of the length of the deflecting edge, such as in the range of 0.3% to 3.5% of the length of the deflecting edge, such as in the range of 0.4% to 2% of the length of the deflecting edge, such as in the range of 0.6% to 1.5% of the length of the deflecting edge. In one or more further or alternative aspects of the present disclosure, the largest total edge deflection of any of the edges of the vacuum insulated glass unit at a temperature difference between the two glass sheets of 40° C. as compared to the vacuum insulated glass unit at a temperature difference of 0° C. may be at least 0.15% of the length of the deflecting edge, such as in the range of 0.15% to 3% of the length of the deflecting edge, such as in the range of 0.25% to 1.8% of the length of the deflecting edge, such as in the range of 0.35% to 1.2% of the length of the deflecting edge.

In one or more aspects of the present disclosure, the edges of the vacuum insulated glass unit extends into a receiving slot provided by the frame, and wherein the receiving slot has a width which is larger than 1.5 times, such as larger than 1.6 times, for example larger than 1.7 times the thickness of the part of the vacuum insulated glass unit which extends into the receiving slot. In one or more aspects of the present disclosure, the receiving slot has a width which is between 1.5 and 4 times, such as between 1.6 and 4 times, for example between 1.7 and 3 times the thickness of the part of the vacuum insulated glass unit which extends into the receiving slot.

This may allow sufficient space for thermal deflection of the VIG unit and also enable space enough to provide a sufficiently water tight solution.

The receiving slot ay in aspects of the present disclosure provide a space of at least 3 mm, such as at least 5 mm, for example at least 6 mm at one or both sides of the vacuum insulated glass unit, determined in a direction normal to the outer surfaces of the vacuum insulated glass unit at a temperature difference ($\Delta T$) between the glass sheets of the vacuum insulated glass unit of substantially 0° C.

The space(s) may e.g. help to provide sufficient room for thermal deflection of the VIG unit in the frame. The space in the slot at one or both sides of the vacuum insulated glass unit may in aspects be between 3 mm and 20 mm, such as between 5 mm and 15 mm.

In one or more aspects of the present disclosure, the receiving slot is provided between the fixation wall and an outer surface part of the elongated, structural frame member. In further aspects of the present disclosure, at least the bonding seal may be arranged in the receiving slot. In aspects of the present disclosure, at least a part of the resilient gasket strip and/or the further adhesive material according to claim, may be arranged in the receiving slot.

In one or more aspects of the present disclosure, the exterior and interior major surfaces of the vacuum insulated glass unit has a surface area which is above 0.8 m$^2$, such as above 1 m$^2$, for example above 1.5 m$^2$, and/or wherein the vacuum insulated glass unit (3) has a rectangular shape. In one or more aspects of the present disclosure, the length of the longest edges of the vacuum insulated glass unit may be above 0.8 m, such as above 1.2 m, for example above 1.3 m.

Such larger VIG units may be subjected to larger thermal deflections at the edges of the VIG unit, and tend to describe larger deflection curves than smaller VIG units.

In one or more aspects of the present disclosure a minimum distance between an outer major surface of the vacuum insulated glass unit and walls of said frame may be at least 4 mm such at least 5 mm, for example at least 6 mm at a temperature difference ΔT between the two glass sheets of the vacuum insulated glass unit of substantially 0° C. This may e.g. help to enable sufficient deflection space for the VIG unit when the VIG thermally deflects.

The present disclosure additionally relates, in a second aspect, to a building, such as a habitat building or an office building, comprising one or more aperture covers, such as wherein said one or more aperture covers is/are windows such as roof windows, for example top hung roof windows or pivot roof windows.

Additionally, the present disclosure relates, in a third aspect to, a vacuum insulated glass (VIG) unit. The VIG unit according to the third aspect comprises a first glass sheet and a second glass sheet, wherein an evacuated gap is placed between the first and second glass sheets. A plurality of support structures are distributed in the evacuated gap, and an edge seal seals the evacuated gap. The vacuum insulated glass unit additionally comprises one or more elongated fixation profiles. Each of the one or more elongated fixation profiles comprises a fixation wall which extends opposite to a major surface of the vacuum insulated glass unit and is fixed to the major surface of the vacuum insulated glass unit by means of a bonding seal. The fixation profile comprises a connection member extending from the fixation wall. This connection member may in aspects be configured to be fixed/connected to an elongated, structural frame member of a frame, such as an elongated structural frame member of a building aperture cover. The connection member of the fixation profile comprises a wall part which overlaps an edge surface of the vacuum insulated glass unit.

This may e.g. provide a solution that is advantageous during manufacturing of an aperture cover such as a window or a door, and if a VIG unit needs to be replaced in a frame. The VIG unit hence comprises a pre-mounted fixation profile, which may provide a more easy installation in a frame. This may e.g. enable providing an aperture covering as described above in relation to the first aspect of the present disclosure.

In one or more aspects of the third aspect, at least said fixation wall of the fixation profile may comprise a metal surface, and wherein said bonding seal is attached to said metal surface. In one or more aspects of the third aspect, said fixation profile is a metal profile.

In one or more aspects of the third aspect, the fixation wall and/or the connection member has a thickness that is less than 10 mm, such as less than 5 mm, for example about or less than 2 mm, such as about or less than 1 mm.

In one or more aspects of the third aspect, the fixation profile may be provided in a single walled plate material such as a metal plate material, a plastic plate material or a composite plate material such as a fibre-reinforced composite plate material.

In one or more aspects of the third aspect, the connection member may comprise a part of a mechanical fastening arrangement and/or may be configured to interact with one or more mechanical fasteners such as screws, nails and/or pop rivets so as to fixate the connection member to an elongated, structural frame member of a frame, so that the elongated structural member is arranged opposite to the major surface of the vacuum insulated glass unit which is placed opposite to the major surface of the vacuum insulated glass unit to which the fixation wall is connected.

In one or more aspects of the third aspect, the connection member and the fixation wall may together substantially provide an angle bracket shape, such as substantially an L-shape, when seen in a plane which extends perpendicular to the longitudinal direction of the fixation profile. For example, in an aspect of the third aspect, The fixation profile may be an L-shaped profile when seen in a plane which extends perpendicular to the longitudinal direction of the fixation profile.

In one or more aspects of the third aspect, the vacuum insulated glass unit is a laminated vacuum insulated glass unit comprising a lamination glass attached to the vacuum insulated glass unit by means of an interlayer, such as wherein the lamination glass provides said interior major surface of the vacuum insulated glass unit.

In one or more aspects of the third aspect, one or both of the glass sheets of the vacuum insulated glass unit which encloses said evacuated gap are tempered glass sheets such as thermally tempered glass sheets, such as wherein said bonding seal bonds to one of said tempered glass sheets.

In one or more aspects of the third aspect, the bonding seal is a flexible, elongated adhesive sealing stripe bonding to the major surface of the vacuum insulated glass unit and to a surface of the fixation wall facing the major surface. In one or more further aspects of the third aspect, the bonding seal has a width of between 2 mm and 30 mm, such as between 3 mm and 15 mm, for example between 4 mm and 13 mm. In aspects of the third aspect, the bonding seal has a width below 15 mm, for example below 10 mm or below 6 mm.

The bonding seal may in one or more aspects of the third aspect, include or be a structural adhesive. In one or more aspects of the third aspect, the structural adhesive may be a silicon adhesive, a silane-terminated polyurethane (SPUR) adhesive or a Modified-Silyl Polymer (SMP) adhesive.

In one or more aspects of the third aspect said bonding seal and/or said fixation profile may be configured to allow edges of the vacuum insulated glass unit to describe an edge deflection curve between corners of the vacuum insulated glass unit due to a thermal deflection of the vacuum insulated glass unit, where the edge deflection curve is provided in a direction perpendicular to a plane defined by an outer major surface of the vacuum insulated glass unit, when the temperature difference between the glass sheets of the vacuum insulated glass unit is substantially 0° C.

In one or more aspects of the third aspect, the fixation wall and/or the connection member is/are configured to flex in response to a thermal deflection of the vacuum insulated glass unit caused by a temperature difference between the glass sheets of the vacuum insulated glass unit.

In one or more aspects of the third aspect the bonding seal may be configured to be further compressed and/or stretched in response to a thermal deflection of the vacuum insulated glass unit caused by a temperature difference between the glass sheets of the vacuum insulated glass unit, thereby changing the thickness of the bonding seal (9) at one or more locations along the fixation wall when compared to the thickness at the same one or more locations when the temperature difference is substantially 0° C.

In one or more aspects of the third aspect, the bonding seal and/or the fixation profile may be configured to partly restrict a thermal deflection of the vacuum insulated glass unit in response to a temperature difference between the glass sheets of the vacuum insulated glass unit, when compared to a free, unrestricted thermal deflection of the vacuum insulated glass unit at substantially the same temperature difference ΔT.

In one or more aspects of the third aspect, the bonding seal has a thickness above 4 mm, such as about or above 6 mm, such as above 8 mm, wherein the thickness of the bonding seal is determined in a direction perpendicular to the exterior major surface at a temperature difference between the glass sheets (3a, 3b) of the VIG unit of substantially 0° C.

In one or more aspects of the third aspect, the bonding seal has a thickness between 4 mm and 30 mm, such as between 4 mm and 15 mm, for example between 4 mm and 10 mm, such as between 5 mm and 10 mm or between 6 and 10 mm. This thickness of the bonding seal is determined/defined in a direction perpendicular to the exterior major surface at a temperature difference between the glass sheets of the VIG unit of substantially 0° C.

In one or more aspects of the third aspect, the exterior and interior major surfaces of the vacuum insulated glass unit has a surface area which is above 0.8 m$^2$, such as above 1 m$^2$, for example above 1.5 m$^2$, and/or wherein the vacuum insulated glass unit (3) has a rectangular shape. In one or more further or alternative aspects of the third aspect the edges of the vacuum insulated glass unit may provide a rectangular shape, and the length of the longest edges (50a, 50b) of the vacuum insulated glass unit (3) may here be above 0.8 m, such as above 1.2 m, for example above 1.3 m.

In one or more aspects of the first and/or third aspect, the part of the connection member, such as a connection wall, of the fixation profile which is configured to be connected to said frame member may extend in a direction which is between 60° and 120°, such as between 85° and 95°, for example around 90° relative to a plane defined by a major outer surface (S1, S2) of the vacuum insulated glass unit.

In one or more aspects of the first and/or third aspect, the fixation profile is free from and unconnected such as un-bonded to the other, opposing oppositely directed outer surface of the vacuum insulated glass unit. This may help to reduce heat transfer at the VIG edge to the interior of the building and/or may help to enable providing a more simple frame solution.

In one or more aspects of the third aspect, said fixation profile may comprise an interface part, such as an elongated wall, which extends away from a plane defined by a major surface of the vacuum insulated glass unit which is configured to be an exterior major surface when the vacuum insulated glass unit is attached to said frame by means of said connection member, and wherein the interface part is configured to interface with a cladding device.

In one or more aspects of the third aspect, said vacuum insulated glass unit is configured to be installed in a door or a window such as a roof window.

In one or more aspects of the third aspect, the fixation profile or fixation profiles of the vacuum insulated glass unit is/are configured to be connected to a frame so as to provide an aperture covering.

It is generally to be understood that in the aspects described above with regard to the third aspect may provide one or more advantages as described in relation to embodiments and/or aspects of the first aspect of the present disclosure described above and/or below.

FIGURES

Aspects of the present disclosure will be described in the following with reference to the figures in which:

FIG. 1: Illustrates an aperture cover according to embodiments of the present disclosure, FIG. 2: illustrates a VIG unit according to embodiments of the present disclosure, FIGS. 3-4: illustrates roof windows according to embodiments of the present disclosure, FIG. 5: illustrates a profile arrangement of a frame according to embodiments of the present disclosure, FIG. 6: illustrates a profile arrangement of a frame and a fixation frame according to embodiments of the present disclosure FIG. 7: illustrates a frame according to further embodiments of the present disclosure, FIG. 8: illustrates a roof window according to embodiments of the present disclosure, FIGS. 9-10: illustrates profile arrangements of a frame according to embodiments of the present disclosure where the cross sectional shape of a fixation profile is different from straight, FIG. 11: illustrates a VIG unit according to embodiments of the present disclosure subjected to thermal deflection, FIG. 12: illustrates a VIG unit according to embodiments of the present disclosure subjected to thermal deflection and providing an edge deflection curve, FIG. 13: illustrates a VIG unit according to embodiments of the present disclosure which is subjected to thermal deflection, the magnitude of which changes over time due to varying temperature difference, FIG. 14: illustrates a visualized computer simulation of a thermal deflection of a VIG unit, FIGS. 15-16: illustrates a thermal deflection test of a laminated VIG unit, FIG. 17: illustrates a frame comprising a laminated VIG unit and furthermore a structural member comprising heat insulating cavities according to various embodiments of the present disclosure, FIG. 18: illustrates a structural member of a frame according to embodiments of the present disclosure, where an exterior surface of the structural member comprises grooves, and FIG. 19: illustrates an embodiment of the present disclosure where a VIG unit comprises pre-mounted fixation profiles.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

FIG. 1 illustrates schematically a building aperture cover in the form of a window 1 according to embodiments of the present disclosure. The window comprises a vacuum insulated glass (VIG) unit 3 fixed in a frame 2. The frame 2 comprises elongated structural frame arrangements 30a-30d, and the VIG unit is arranged to cover a frame opening 2a in the frame. The frame defines a frame opening plane P2, and in FIG. 1, the window is seen from the outside towards the exterior surface S1 of the VIG unit.

The structural frame arrangements 30a-30d comprises substantially parallel top 30d and bottom 30c frame arrangements and substantially parallel side profile frame arrangements 30a, 30b. Two, three or all (as illustrated) of said top, bottom and/or side profile frame arrangements 30a-30d may in embodiments of the present disclosure, at least partly, such as fully, encloses the edges of the VIG unit. In FIG. 1, the VIG unit is arranged in a frame 2 in form of a sash which is connected to a fixation frame 12 by means of a displacement mechanism such as one or more hinged connections configured to allow the sash to move relative to the fixation frame 12. Hence a user, such as a habitant living in a building comprising the window may open and close the window by operating the sash, either by hand or by a remote control, such as a wireless remote control, that is configured to control an electrically operated actuator device such as a linear actuator such as a spindle or chain drive (not illustrated in FIG. 1).

In other embodiments, the frame may also be fixed in an un-openable manner to the fixation frame or directly to a building structure.

A gasket arrangement 10, a bonding seal 9 (described in more details later on) and/or the like may in one or more embodiments of the present disclosure be arranged to seal a space between a part of the frame and the VIG unit. In the present example, the gasket 10 and bonding seal 9 (or only one of these) defines a "line of sight" through the frame opening 2a and through the VIG unit in the frame.

The line of sight LS may generally be defined by an envisaged line that is perpendicular to the interior surface S2 of the VIG unit and which provides the outermost border for a view through the VIG unit and frame opening 2a from the interior side of the VIG unit.

Figure 2:
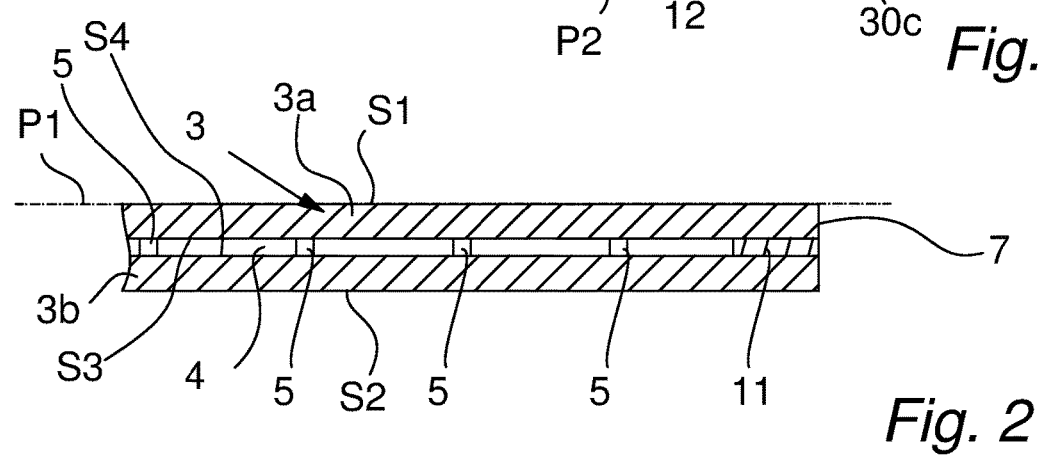

FIG. 2 illustrates schematically a cross sectional view of a VIG unit 3 to be arranged in the frame 2 according to embodiments of the present disclosure. The VIG unit 3 comprises two glass sheets 3a, 3b such as tempered glass sheets, e.g. thermally tempered glass sheets, but it one or both glass sheets 3a, 3b may also be float glass sheets such as annealed glass sheets.

The glass sheets 3a, 3b are separated by a gap 4 between the glass sheets 3a, 3b, and a plurality of support structures 5 are distributed in the gap 4. The gap 4 may for example have a thickness/width of between 0.05-0.5 mm such as between 0.09 mm and 0.25 mm (measured normal to a plane P1 defined by a major surface of one of the VIG unit glass sheets 3a, 3b at a temperature difference between the VIG glass sheets 3a, 3b of substantially 0° C. The gap 4 is sealed by an edge sealing 11, such as a fused edge sealing, which may e.g. be made from a solder glass material, e.g. low melting temperature solder glass material, or a metal solder material.

The support structures 5 may for example be made from metal, such as a steel alloy, glass or a polymer composition and be arranged in a grid or another pattern to maintain the gap 4 between the glass sheets 3a, 3b when the gap 4 is evacuated to a pressure below e.g. $10^{-3}$ bar, such as below $10^{-4}$ bar, e.g. to about or below $10^{-3}$ mbar. The glass sheets 3a, 3b comprises major surfaces S3, S4 facing the evacuated gap 4, and the support structures 5 support on these inner major surfaces. The VIG unit also comprises outwardly facing major surfaces S1, S2 facing away from the gap 4.

Especially if the VIG unit glass sheets 2a, 2b are tempered glass sheets, the distance/pitch between neighbouring/adjacent support structures 5 may be above 3 cm or above 4 cm, such as between 3 cm and 6 cm in the evacuated VIG unit gap 4.

As described in more details later on, the VIG unit 1 may also be a laminated VIG unit and/or a VIG unit of a hybrid type comprising a further glass sheet providing a further sealed gap between this glass sheet and the VIG unit that may be filled with a gas.

The VIG unit's thickness, measured between the outer, outwardly facing surfaces S1, S2 of the VIG unit, determined in a direction normal to these surfaces, may in embodiments be between 4-15 mm such as between 4-12 mm, e.g. 4-10 mm, This thickness may preferably include an optional lamination glass sheet and lamination interlayer.

The VIG unit 1 defines a VIG unit plane P1 that will extend parallel to or coincide with the frame opening plane P2 (see FIG. 1) when the VIG unit is arranged in the frame 2. This plane P1 may e.g. be determined when the VIG unit glass sheets 3a, 3b have the substantially same temperature and no substantial thermal deflection of the VIG unit occur, i.e. when a temperature difference ($\Delta T$) between the glass sheets 3a, 3b enclosing the gap is substantially 0 ($\Delta T=0°$ C.).

Figure 3:
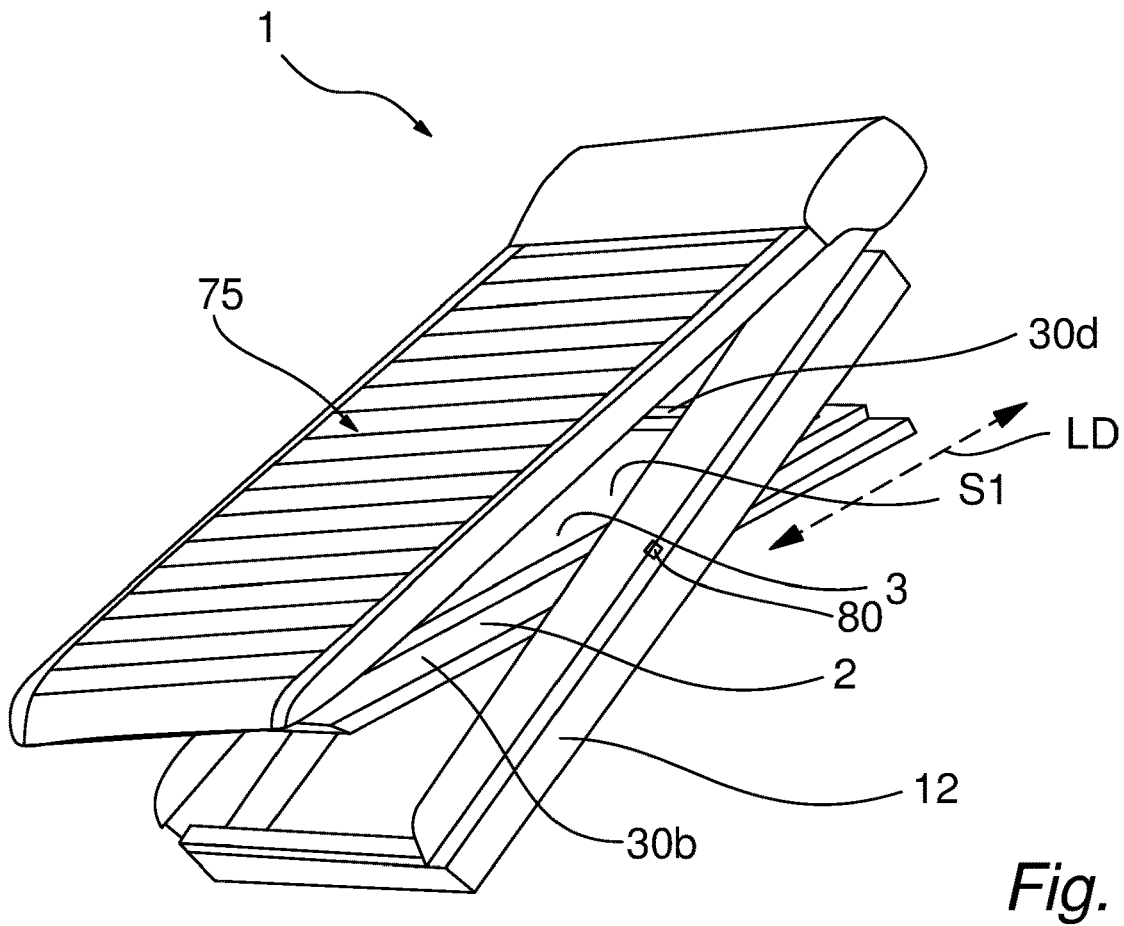

FIG. 3 schematically illustrates an embodiment of the present disclosure, wherein the building aperture cover is a roof window 1. The roof window is configured to be placed in a roofing structure of a building, such as a building for habitants, an office building or the like. The roof window may in embodiments of the present disclosure be arranged between two roof trusses, but it may also be arranged to another part of the roof structure in further embodiments. The roof window may either be configured to be arranged with an angle between 5° and 85°, such s between 10° and 75°, compared to horizontal, and rain and melting water, dew and the like will thus be guided towards a bottom part/end of the window due to gravity.

The roof window 1 comprises a frame in the form of a movable sash which is connected to a fixation frame 12 of the aperture covering 1 by means of a displacement mechanism 80 such as one or more hinged connections configured to allow the sash 2 to move relative to the fixation frame 12. In the example of FIG. 3, the roof window is a pivot roof windows comprising pivot hinges providing an axis of rotation placed between the top and bottom of the sash. Often the axis of rotation is substantially about the centre. But sometimes the axis of rotation can for example be raised such as ⅓ of the total window or sash height. The hinge connection is so that a top end part of the sash is configured to move inwards and a bottom end part of the sash is configured to move outwards when opening the sash from a closed position.

A pivot roof window may e.g. allow rotation of the sash 2 so the exterior surface S1 of the VIG unit may be cleaned from the inside. The weather proofing and water drain for especially roof windows should be carefully designed for roof windows that can be opened, including pivoting roof windows.

As can further be seen, the roof window in FIG. 3 may in embodiments of the present disclosure comprise an architectural covering 75, in the present example a roller shutter, but it may also be a blind such as a venetian blind, a roller blind or the like in further embodiments. The roller shutter may be electrically operated by means of an electric motor (not illustrated), so as to open or close the roller shutter and controlled by an automation solution and/or by means of a wired or wireless remote control. As can be seen, the roller shutter can be placed at the exterior side of the window.

It is however understood that in further embodiments of the present disclosure, the roller shutter and/or other types of architectural coverings may be omitted from the roof window.

Figure 4:
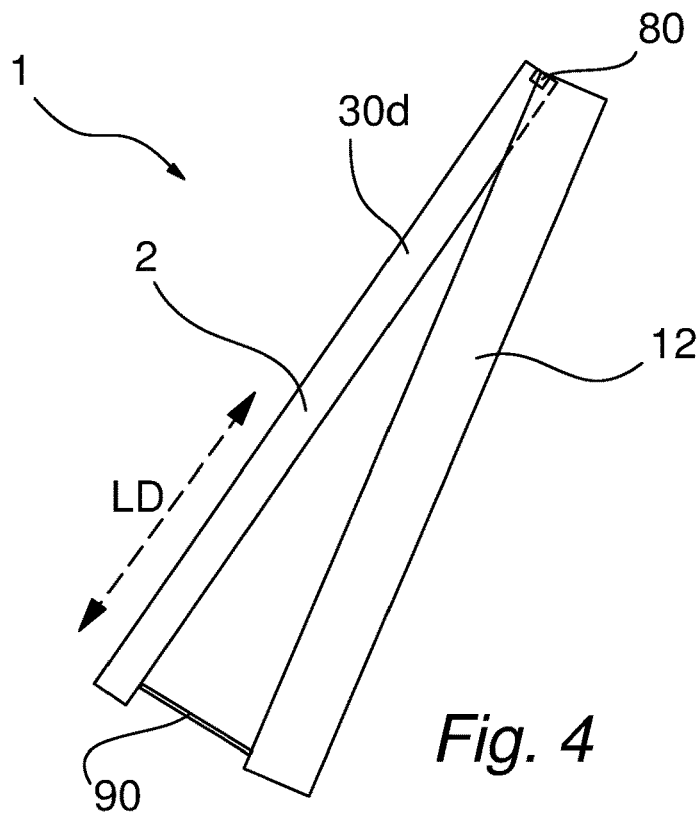

FIG. 4 schematically illustrates a roof window 1 according to an embodiment of the present disclosure, seen from the side, wherein the roof window is a top hung roof window. Here, the sash 2 is connected to the fixation frame 12 at the top part by a hinge arrangement, and the top part does hence not pivot inwards when the sash with the VIG unit is opened.

Generally, for both types of roof windows as illustrated in FIGS. 3 and 4, the window may as illustrated in FIG. 4 be assigned with an electric actuator 90 such as a spindle actuator or chain actuator that can be operated in response to an input from an automation system or a wired or wireless remote control to open or closed the sash 2. The actuator 90 may be arranged at the top part (relevant for the pivot roof window) or bottom part of the sash.

Figure 5:
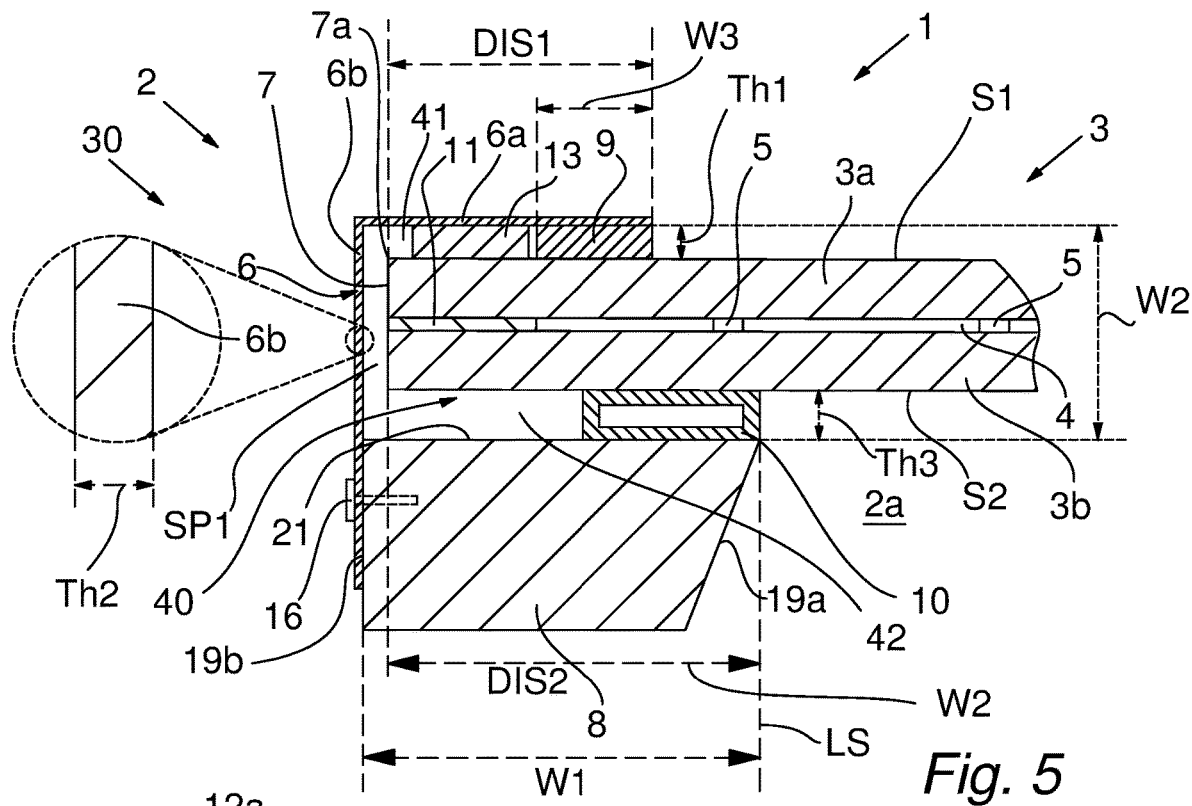

FIG. 5 illustrates a cross section of a profile arrangement of a frame 2, such as a sash, according to embodiments of the present disclosure. The cross section may be a cross section of e.g. a structural side profile arrangement 30a of the frame 2. However, it is generally understood that the cross section may be provided for one, two, three or all of the top 30d frame arrangement, bottom 30c frame arrangement and one or both of the parallel side profile frame arrangements 30a, 30b (see e.g. FIG. 1), and hence, the frame profile arrangement has generally be assigned the reference number 30 in FIG. 5 and several of the figures described further below.

The frame 2 encloses a frame opening 2a, and comprises elongated fixation profiles each of which are fixed to and arranged parallel to an elongated structural frame member 8 of the frame profile arrangement 30.

It is generally understood that the fixation profile 6 may be an aluminium profile, such as an extruded or pultruded or roll formed aluminium profile, or it may be a steel alloy profile that may be produced in one of said ways. In one or more aspects of the present disclosure, said metal profile may be an aluminium profile comprising at least 70% by weight aluminium, such as at least 90% by weight aluminium, for example at least at least 98% by weight aluminium.

However, in other embodiments of the present disclosure, the fixation profile 6 may be a profile comprising or made from a plastic material such as a PVC or PUR material, or a composite material such as a fibre-reinforced composite plate material.

The fixation profile may in further embodiments of the present disclosure (not illustrated) be a profile made from another material than a metal, e.g. a material as described above, and a metal layer, such as a metal sheet or plate may be arranged between the fixation wall and the VIG surface S2, the bonding seal may here bond to this metal layer and the metal layer may be fixed to a fixation wall part of the fixation profile by an adhesive, mechanical fasteners and/or the like.

The fixation profile is in FIG. 5 as well in several of the figured described below provided in a single walled plate material such as a metal plate material, a plastic plate material or a composite plate material such as a fibre-reinforced composite plate material. In other embodiments, the fixation profile, such as the fixation wall and/or the connection member 6b may comprise several parallel walls e.g. spaced apart by a heat insulating space.

It is generally understood that the parts 6a, 6b (and possibly also a further part 6c—see FIG. 8) may be an integrated part of the fixation profile 6. This may e.g. be obtained by means of pultrusion and/or extrusion, or by bending and/or heating a plate such as a metal plate/sheet. In further embodiments of the present disclosure, at least a part or the whole cross sectional shape of the fixation profile 6 may be obtained by means of a welding or soldering manufacturing.

The elongated fixation profile 6 comprises a fixation wall 6a extending opposite to an exterior major surface S1 of the vacuum insulated glass unit 3 and is fixed to the exterior major surface S1 of the vacuum insulated glass unit 3 by means of a bonding seal 9. The fixation profile 6 moreover comprises a connection member in the form of a wall 6b extending from the fixation wall 6a, and the connection member 6b affix the fixation profile to the elongated, structural frame member 8. The connection member 6b and the fixation wall 6a together comprise an L-shape, when seen perpendicular to the longitudinal direction of the metal profile 6.

One or both of the fixation wall 6a and/or the connection member 6b of the fixation profile 6 may as illustrated in FIG. 5, in embodiments of the present disclosure be provided by a substantially solid, single walled construction.

The elongated structural member 8 faces the interior major surface S2 of the vacuum insulated glass unit 3 placed opposite to the exterior major surface S1 of the vacuum insulated glass unit. The interior major surface S2 is the exposed outer surface of the VIG unit that is to face the interior of the building when installed in a wall or a roof structure of a building. If the VIG unit is a laminated VIG unit, which it may be in embodiments of the present disclosure, the lamination glass may be arranged to face the building interior and hence provide the interior surface S1.

The bonding seal 9 may have a thickness Th1 between 4 mm and 30 mm. for example, the thickness Th1 may be between 4 mm and 15 mm, such as between 5 mm and 10 mm, for example between 6 and 10 mm, at a temperature difference between the two glass sheets 3a, 3b of the VIG unit of 0° C. The thickness Th1 is measured in a direction substantially perpendicular to the exterior major surface S1 between the outer surface S1 and the fixation wall 6a.

The bonding seal 9 may in embodiments of the present disclosure be a flexible and in further embodiments also resilient, elongated adhesive sealing stripe 9 and may bonds to the exterior major surface S1 of the vacuum insulated glass unit 3 and to an inner surface of the fixation wall 6a facing the exterior major surface S1. For example, the bonding seal 9 may be or include a structural adhesive such as a silicon adhesive, a silane-terminated polyurethane (SPUR) adhesive or a Modified-Silyl Polymer (SMP) adhesive. The seal 9 may also be a resilient gasket solution, e.g. containing a rubber, such as natural or synthetic rubber.

As illustrated, the bonding seal 9 may be arranged to bond to the exterior major surface S1 of the VIG unit so that the bonding seal material 9 is terminated (in it's width) before (as illustrated in FIG. 5) or substantially at the edge 7a of the VIG unit separating the major surface S1 and the edge surface 7, thereby the material of the edge seal does not extend to bond to the edge surface 7 of the vacuum insulated glass unit 3.

The bonding seal 9 may as illustrated be located opposite to the evacuated gap 4, but it may also be arranged to lap in over and thus be opposite to the edge seal 11 of the vacuum insulated glass unit (not illustrated in FIG. 5). The bonding seal 9 may be moved further in over the gap, away from the edge 7a in order to allow a more free thermal deflection of the VIG edge, or may be moved further towards the edge 7a.

In embodiments of the present disclosure, the bonding seal 9 may have a width W3 of between 2 mm and 30 mm, such as between 3 mm and 15 mm, for example between 4 mm and 13 mm, measured in a direction perpendicular to the surface 7 and to the longitudinal extent LD of the bonding seal 9, and parallel to the outer surface of the VIG unit to which it bonds.

The bonding seal 9 width W3 may in embodiments of the present disclosure be above 2 mm, such as above 4 mm, for example above 6 mm or above 8 mm. The bonding seal 9 width W3 may in embodiments of the present disclosure be below 15 mm, for example below 10 mm below 6 mm or about or below 4 mm.

Hence, in embodiments of the present disclosure, the width W3 may be between 2 mm and 15 mm, such as between 2 mm and 10 mm, such as between 2 mm and 6 mm or between 2 and 4 mm. The width W3 may be substantially constant in the entire length of the bonding seal (at a temperature difference between VIG glass sheets 3a, 3b of substantially 0° C.), or may alternatively be varied to be different around/near the corner area of the VIG unit which may be from the corner of the edge and up to between 10 cm and 25 cm from the corner in the longitudinal direction of the edge surface 7 and the bonding seal, when compared to the width W3 at the remaining part of the edge of the VIG unit 3.

The elongated structural member 8 may in embodiments of the present disclosure comprise a wood material, e.g. a softer wood material such as pine wood, or a harder wood material such as oak, beech, mahogany or the like. The wood may be laminated.

In other embodiments of the present disclosure, the elongated, structural member 8 may comprise a polymer material such as a plastic material, e.g. PVC, a PUR material and/or a fibre reinforced material such as a glass fibre or carbon fibre reinforced material or a composite material. In such cases, the overlapped structural member may be manufactured by means of pultrusion and/or extrusion, so as e.g. co-extrusion.

In other embodiments the elongated, structural member 8 comprises aluminium such as aluminium shells joined by thermal breaks.

The structural member 8 may in embodiments of the present disclosure be substantially solid as shown in FIG. 5.

In further embodiments of the present disclosures, it may comprise one or more insulation cavities (not illustrated in FIG. 5, see e.g. FIG. 17), and the insulating cavities may either comprise air, comprise one or more hermetically sealed cavities containing an insulation medium such as an insulating gas, the cavities may be filled with an insulating foam, a polystyrene material and/or a glass fibre insulation such as glass or mineral wool.

The fixation wall 6a extends with a distance DIS1 in over the exterior surface S1 from the edge 7a of the vacuum insulated glass unit. The distance DIS1 may in embodiments of the present disclosure be no more than 70 mm, such as no more than 50 mm, such as no more than 30 mm, for example no more than 20 mm, and determined at a distance parallel to the surface S1 and perpendicular to the longitudinal direction LD of the edge 7a.

Hence, as illustrated the structural member 8 may extend DIS2 in over the interior surface S2 with a larger distance than the distance DIS1 with which the fixation member extends in over the exterior surface S1. In embodiments, the elongated structural member 8 may overlaps the opposite interior major surface S2 of the vacuum insulated glass unit 3 with a larger overlapping distance DIS2, such as an at least 5% larger, such as at least 10% larger, for example an at least 20% larger overlapping distance DIS2 than the overlapping distance DIS1 with which the fixation wall 6a overlaps the exterior major surface S1.

In this case, a masking such as a sheet, plate or coating, such as a ceramic coating, may in embodiments of the present disclosure be arranged at the VIG unit opposite to the structural member 8 in order to hide a part of the structural member 8 and/or a gasket 10, that may otherwise be visible through the VIG unit from the outside. This may help to provide the impression of a larger window surface and hence narrower frame, while at the same time hiding parts of the frame from the outside. In case of the ceramic coating, it may be provided as a coating burned into/onto the glass during a tempering of the glass sheet 3a or 3b.

The VIG unit 3 may in embodiments of the present disclosure overlap DIS2 at least 60%, such as at least 80%, such as at least 95% of the largest width W1 of the elongated, structural frame member 8. The width W1 is measured in a direction parallel to a major surface S2 of the VIG unit, and substantially perpendicular to the longitudinal direction of the overlapped structural member 8.

The overlapping distance DIS2 may in embodiments of the present disclosure be at least 25 mm, such as at least 35 mm, such as at least 50 mm. The overlapping distance DIS2 of the elongated structural member may be at or below 100 mm, such as below 70 mm, for example below 50 mm.

In one or more embodiments of the present disclosure, the ratio between the distance DIS2 and the length LEL of the longest edge of the vacuum insulated glass unit 3 (see edges 50a and 50b in figures illustrating edge deflection) is at least $$\frac{DIS2}{LEL} = \frac{25}{LEL}$$

such as at least $$\frac{35}{LEL},$$

for example at least $$\frac{50}{LEL}.$$

For example, the ratio may, if the length LEL of the longest edge(s) is 1400 mm and DIS2 is 25 mm, be DIS2/LEL=25/1400=0.018.

The ratio between the overlapping distance DIS2 and the longest edge length LEL may preferably be within 0.015 and 0.07, such as between 0.017 and 0.06, for example between 0.018 and 0.05.

The elongated structural member 8 may have a maximum width W1 of between 25 mm and 100 mm, such as between 30 mm and 70 mm, for example between 35 mm and 50 mm.

The structural member 8 may also in embodiments of the present disclosure comprise one or more strengthening elongated parts (not illustrated in FIG. 5) for increasing the rigidity of the elongated, structural member 8. These may be made from a metal such as steel or aluminium, or from a polymer material or another suitable material.

It is understood that the fixation profile 6, such as the connection member 6b may also, in embodiments of the present disclosure, help to increase the rigidity against bending of the member 8.

As can be seen, the connection member 6b extends from the fixation wall 6a and overlaps the edge surface 7 of the vacuum insulated glass unit 3, before it is connected to the structural member 8.

The thickness Th2 of the connection member 6b, at least at the location overlapping/"extending opposite to" the edge surface 7 of the vacuum insulated glass unit 3 may in embodiments of the present disclosure be between 0.5 mm and 5 mm, such as between 0.8 or 1 mm and 3 mm.

Generally, in one or more embodiments of the present disclosure, the fixation wall 6a and/or the connection member 6b may have a thickness that is less than 10 mm, such as less than 5 mm, for example about or less than 2 mm, such as about or less than 1 mm.

As can be seen, there may in embodiments of the present disclosure be provided a space SP1 between the VIG unit edge surface 7 and the connection member, for example of between 1 mm and 2 cm, such as between 2 mm and 10 mm, which allows the VIG unit to thermally deflect relative to the connection all. In further embodiments, a sealing gasket (not illustrated in FIG. 5) may be arranged in the space SP1.

It is understood that the connection member 6b may be fixed to the elongated, structural member 8 by means of one or a plurality of mechanical fasteners 16, In FIG. 5 it is a plurality of screws, Only one is though shown. Alternatively or additionally, the mechanical connection may comprise one or more of a snap connection, positive engagement like tongue and groove, screws, nails or pop rivets. Also or alternatively, a chemical fastener such as a glue may be used for fixating the connection member to the elongated, structural member 8.

If the member 8 is made from wood, these 16 may be screws and/or nails. In other embodiments, the profile 8 may be a polymer profile such as a plastic material profile and/or a fibre reinforced material, such as a carbon or glass fibre profile as explained e.g. above. Here, the profiles 8 may comprise elongated grooves (not illustrated) for connection purposes, e.g. for receiving and holding connection hardware such as mountings. Also, in embodiments, protruding pins (not illustrated) may be inserted into blind holes of the member 8 so as to transfer forces. Then a fastener may hold the parts in position but does not have to transfer all the forces.

The connection member 6b is in FIG. 5 an elongated connection wall that is fixed to the structural member 8 by means of a plurality of mechanical fasteners 16 distributed along the length of the member 8 and the wall 6b. This connection wall may extend substantially uninterrupted along at least 90% or 95% of the length of the fixation profile.

It is generally understood that the elongated structural frame member 8 comprises an inner side surface 19a facing the frame opening 2a, and an opposing outer side surface 19b facing away from the frame opening 2a. The edge surface 7 of the vacuum insulated glass unit does not in FIG. 5 extend beyond the outermost part of the outer side surface 19b of the overlapped structural member 8, instead the edge surface 7 of the VIG is arranged at a point between the surface 21 of the overlapped structural member 8 that faces the VIG unit 3, and the fixation wall 6a.

A resilient gasket strip 10 is arranged between the overlapped elongated structural member 8 and the interior major surface S2 of the VIG unit, so that the resilient gasket strip 10 abuts the elongated structural member 8 and the interior major surface S2 of the vacuum insulated glass unit.

The resilient gasket strip 10 has a thickness/height Th3 between 4 mm and 30 mm, such as between 6 mm and 20 mm, for example between 5 mm and 15 mm, or such as between 9 mm and 18 mm at a temperature difference between the two glass sheets (3a, 3b) of substantially 0° C., where said thickness is determined in a direction normal to the interior major surface S2.

The fixation profile 6 may, in case the bonding seal is e.g. a structural adhesive, holds a part of the VIG unit so that the VIG unit so to say may partly "hangs" on the fixation wall 3a, and hence this may help to for example spare the gasket strip 10 against unintentional loads over time.

The resilient gasket strip 10 may in embodiments of the present disclosure be a pre-compressed or pre-deflected gasket strip, such as a rubber, e.g. natural or synthetic rubber material gasket or an elastomer gasket. Hence, in case of that the VIG unit's edge is subjected to substantial thermal deflection so that the surface S2 moves towards and/or away from the gasket 10, the gasket is either further deflected/compressed, or is less compressed if the surface S2 moves away from the gasket 10. The gasket strip 10 may in embodiments of the present disclosure be softer than the bonding seal 9 material at 20° C. and hence more easily deflected than the bonding seal 9.

The resilient gasket 10 may be have an interior space/cavity (see FIG. 5) helping to provide a more soft gasket, it may comprise one or more deflectable lips (not illustrated in FIG. 5 see FIG. 8) abutting the VIG unit surface ad attached to the member 8 and/or the like. The gasket 10 may also comprise a resilient foam material.

As illustrated in FIG. 5, a further adhesive material 13, such as an adhesive tape, e.g. a double sided foam tape, for example acrylic foam tape may be placed between the fixation wall 6a and the exterior major surface S1, The further adhesive material is fixed to at least one of the fixation wall 6a and the exterior major surface S1 of the vacuum insulated glass unit 3. It is generally understood that the bonding seal 9 and the further material 13 preferably may be made from different materials having different structural and/or adhesive properties in order to provide different technical purposes.

It is understood that in embodiments of the present disclosure, the displacement mechanism, such as a hinged connection, see ref. 80 in FIG. 3 or 4, may be connected to the fixation profile 6 and/or the overlapped structural member 8 of the sash 2 so the fixation profile 6 and/or the structural member 8 carries the sash in the frame opening of the fixation frame 12.

The bonding seal 9 and fixation profile 6 may in embodiments of the present disclosure carry the majority of the weight, such as at least 60%, for example at least 70%, such as at least 90% of the weight of the vacuum insulating glass unit 3. Alternatively or additionally a carrying structure (not illustrated) may be placed between the structural member 8 and the VIG unit, and/or or the gasket 10 may carry the VIG unit.

As can be seen from FIG. 5 and several of the other figures described below, the edge of the vacuum insulated glass unit extends into a receiving slot 40 that is provided between the fixation wall 6a and the surface 21 of the overlapped, structural member 8. This slot 40 has a width W2 which is between 1.5 and 4 times, such as between 1.6 and 4 times, for example between 1.7 and 3 times the thickness of the part of the vacuum insulated glass unit which extends into the receiving slot. This thickness of the VIG unit is determined between the outer surfaces S1, S2, in a direction normal to the surfaces S1, S2.

As can be seen, the bonding seal 9, and the resilient gasket strip 10, and possibly also the optional further material 13 is arranged in the receiving slot 40 in spaces 41, 42 of the slot 40. A first space 41 is provided in the slot 40 between the fixation wall 6*a* and the VIG unit. Another space 42 is placed between the VIG unit 3 and the structural member's 8 surface 21. One or both of these spaces may have a width of at least at least 5 mm, for example at least 6 mm, such as at least 8 mm. This width is determined in a direction normal to the outer surfaces S1, S2 of the vacuum insulated glass unit, between the VIG surface S1 and the fixation wall 6*a*, and between the VIG unit surface S2 and the surface 21 of the structural member 8, respectively. The thickness is determined at a temperature difference between the glass sheets of the vacuum insulated glass unit of substantially 0° C., and when the window is arranged as intended after installation. The space 41, 42 widths are in FIG. 5 substantially corresponding to the thickness/heights Th1, Th3 of the bonding seal 9 and gasket 10 respectively.

It is generally understood that a resilient gasket (not illustrated) may in further embodiments be placed at the same side of the VIG unit as the bonding seal 9 in order to ensure sufficient tightness. This gasket may be attached to the fixation wall or additionally or alternatively to the VIG unit surface bonded to the bonding seal. In case for example the bonding seal 9 may be terminated at certain areas of the VIG unit so that it does not extend substantially continuously and uninterrupted around the VIG unit, but instead provides discrete areas (not illustrated) along the VIG unit edges where the bonding seal is placed, a further gasket such as a rubber, elastomer and/or foam gasket may be placed to provide a water sealing between the VIG unit's outer surface and the frame. This gasket may be substantially similar to the sealing gasket 10 arranged at the interior surface of the VIG unit.

In embodiments of the present disclosure, a minimum distance between an outer major surface S1, S2 of the vacuum insulated glass unit and one or both walls/surfaces 13*a*, 11 of the frame may be at least 4 mm such at least 5 mm, for example at least 6 mm at a temperature difference $\Delta T = T1 - T2$ between the two glass sheets 3*a*, 3*b* of the vacuum insulated glass unit 3 of substantially 0° C. This distance is measured perpendicular to the respective VIG unit surface S1, S2.

Figure 6:
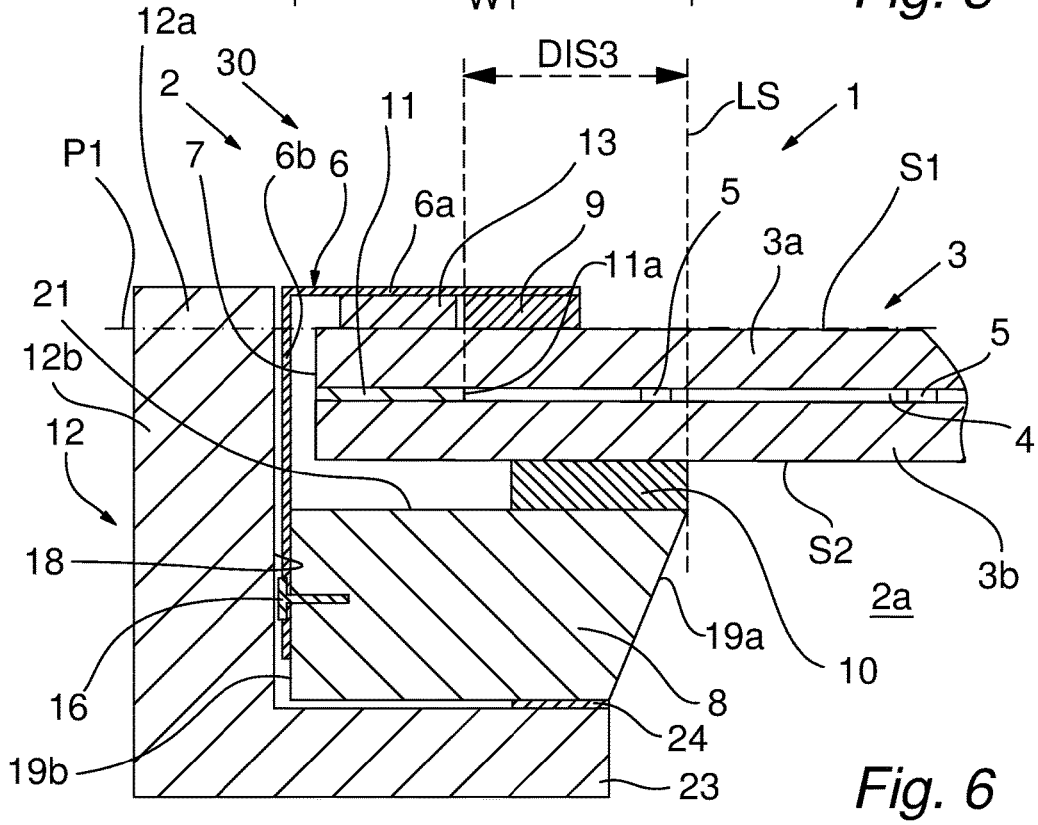

FIG. 6 illustrates an embodiment of the present disclosure, where the frame 2 is a sash which is connected to a fixation frame 12 as e.g. previously described. The fixation frame 12 comprises an elongated frame arrangement 12*a*. The connection member 6*b* of the fixation profile 6 is configured to extend between the elongated structural member 8 of the sash, to which it is connected, and the inwardly facing surface 18 elongated member 12*a* of the fixation frame 12, when the sash is in a closed position. Accordingly, the connection wall 6*b*, of the fixation profile 6 is isolated from the interior part of the building, as the structural member that is overlapped by the VIG unit is arranged between the frame opening and the connection member 6*b*, and the. Hence, the overlapped structural member 8 provides an insulation structure to reduce a heat transfer from the VIG unit (and/or from the exterior in general), to the fixation profile and from there to the interior of the building.

As can be seen from FIG. 6, the elongated member 12*a* of the fixation frame 12 may comprise a an elongated support part 23 extending in under the overlapped structural member 8 of the sash, which may for example be relevant in case the window is a vertical window for an outer wall of a building, or if it is a Top-hung Roof window. This part 23 may help to enhance insulation and hence reduce heat transfer, and/or help to enhance water tightness. Hence, in embodiments, one or more resilient tightening gaskets 24 may be placed between the support part 23 and the sash 2, so that the sash 2 is pressed against the tightening gasket(s) 24 when the sash 2 is in a closed position.

FIG. 6 (and also the other figures described above and/or below) moreover illustrates a further embodiment of the present disclosure, where the overlapping of the elongated structural member 8 by the VIG unit 3 provides that the evacuated gap 4 extends in over/overlaps the surface 21 of the structural member with a distance DIS3.

The distance DIS3 with which the gap 4 overlaps the structural member is defined as from the inner surface 11*a* of the edge seal 11, and to the line of sight (LS) through the vacuum insulated glass unit 3 and the frame opening 2*a* is between 15 or 25 mm and 100 mm, such as between 25 mm and 80 mm, such as between 30 mm and 70 mm, where the distance DIS3 is determined parallel to an outer major surface (S1, S2) of the vacuum insulated glass unit.

Figure 7:
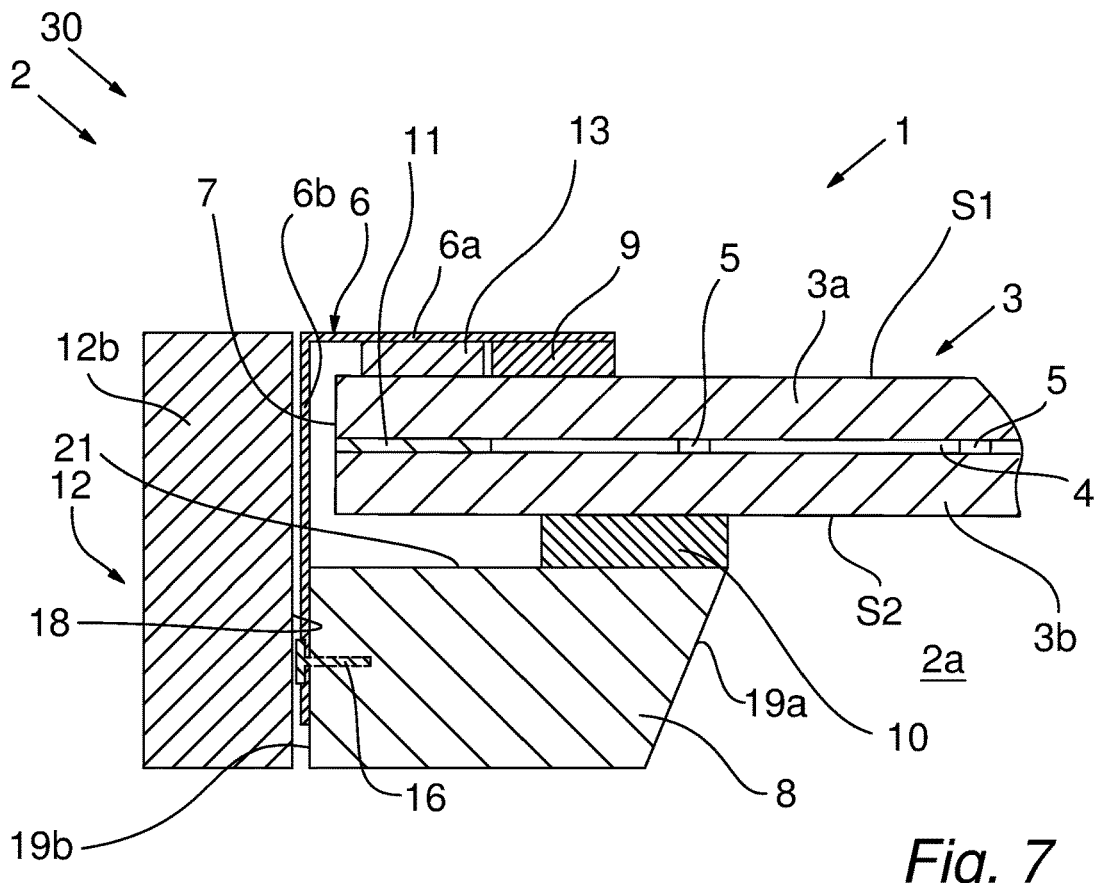

FIG. 7 illustrates schematically a frame arrangement 30 of a pivot window, such as a pivot roof window, according to embodiments of the present disclosure. In FIG. 7, the sash is in a closed position. Here the overlapped, structural frame member 8 can pivot relative to the fixation frame 12, so as to open and close the sash 2. The fixation profile is fixed to the overlapped structural member 8 as described above with respect to FIGS. 5 and/or 6, and the same is the case with regards to the fixation of the VIG unit 3 to the frame. In FIG. 7, however, no elongated support part 23 extending in under the overlapped structural member 8 of the sash is present in FIG. 7, and hence, the sash 2 can move both inwards and outwards relative to the fixation frame 12, so as to pivot as illustrated in FIG. 3.

Figure 8:
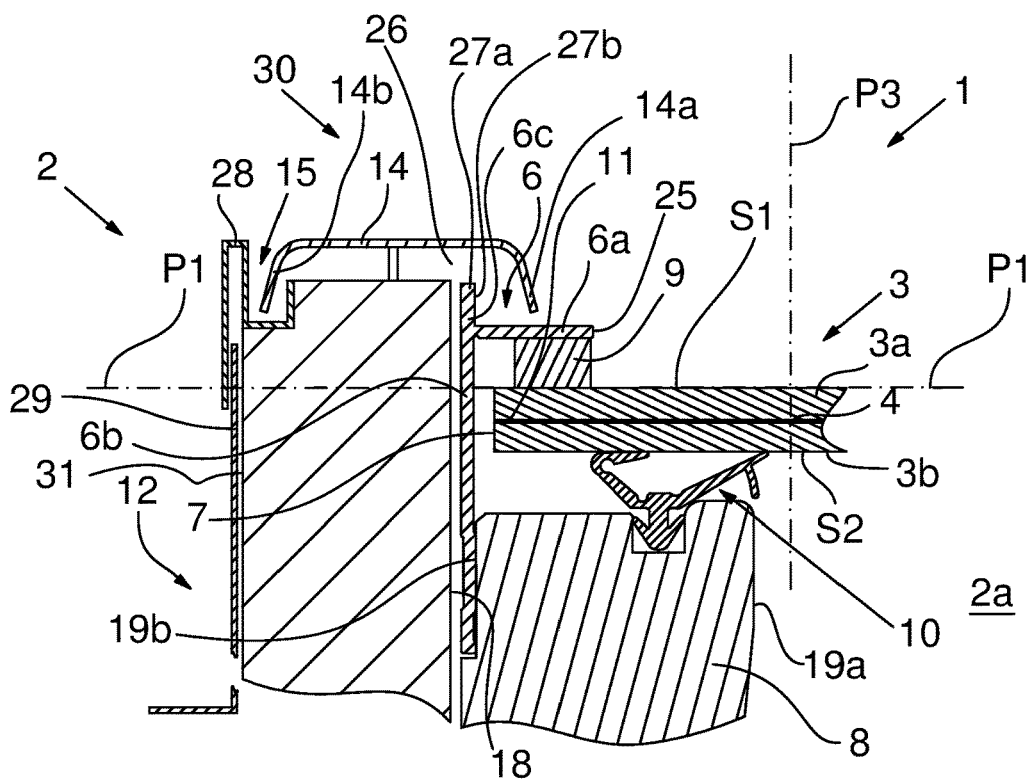

FIG. 8 illustrates schematically a frame arrangement 30 of a pivot roof window according to embodiments of the present disclosure. Here, the roof window 1 comprises a cladding device 14 which covers a part of the sash 2, and as illustrated, it may preferably cover at least a part of the vacuum insulated glass unit 3, and/or the fixation wall 6*a* of the fixation profile 6 dependent on the construction of the sash. In FIG. 8, rain water will be guided from the outer surface of the cladding 14 and onto the upper surface of the fixation wall facing away from the VIG unit. It is understood that the cladding device 14 in FIG. 8 may be provided at either the side parts and/or top part of the window, whereas the bottom part of the window may have another water tightening solution, for example in case that the a top end part of the sash 2 is configured to move inwards and a bottom end part of the sash 2 is configured to move outwards when opening the sash from a closed position.

However, in other embodiments of the present disclosure (not illustrated), the cladding device 14 may extend in over the outer edge 25 of the VIG fixation wall, so that at least the majority of the rain water is led from the cladding 12 and directly onto the VIG unit surface S1.

The cladding device 14 may be fixed to the fixation frame as illustrated. Alternatively, the cladding device 14 may be fixed to the sash 2, but that may depend on the type of window. In some embodiments, that may be especially suitable for a pivot hinge roof window, the window 1 may comprise two cladding device systems, one attached to the fixation frame and the other attached to the sash 2 or VIG unit 3 (This is not illustrated in FIG. 8).

As can be seen, the cladding device 14 comprises a first inclining, elongated wall part 14*a* which inclines towards the VIG unit surface S1 or wall 6*a* in order to guide rain water towards the VIG unit surface S1 and/or fixation wall 6*a*.

The cladding device 14 moreover covers the upper part of the fixation frame 12, so that rain water is guided from the cladding device 14 and into a receipt part 15, such as a water drain channel, of the aperture covering 1 that extends along the side elements/parts of the window. A second elongated wall part 14b of the cladding device 14 inclines towards the channel 15 in order to guide the rain water into the channel.

As also illustrated in FIG. 8, the channel 15 may be formed/shaped by a bended or extruded plate 28, such as a metal, plastic (e.g. PVC or PUR) and/or fibre (e.g. carbon and/or glass fibre) reinforced plate that is fixed to the fixation frame 12. A part of this plate 28 extends out over and interfaces with a flashing part 29. The flashing part 29 may be a plate or flexible, waterproof sheet material that is substantially un-permeable to water.

In other embodiments of the present disclosure (not illustrated in FIG. 8), the channel at the fixation frame may be omitted. Instead the wall 14b my extend out over the outer side surface 31 of the elongated member 12a of the fixation frame 12 which faces away from the frame opening 2a, and hence and guide the rain water directly towards the flashing 29 on the roof instead of into a channel.

As can furthermore be seen from FIG. 8, the fixation profile 6 may in further embodiments of the present disclosure comprise an interface part 6c, in the present example it is an elongated wall which extends away from a plane P1 defined by the exterior major surface S1 of the VIG unit. The interface part 6c is configured to interfaces with the cladding device 14, and extends into a space 26 defined by the cladding device 14. The interface part helps to prevent rain water from the cladding device and/or from rain striking the wall 6a and/or surface S1 from entering in between the fixation frame and the sash. In the example of FIG. 8, the interface part is a straight single walled construction, but it may also comprise a bended wall construction. The interface part 6a may be an integrated part of the fixation profile 6 as illustrated in FIG. 8, but it may also in other embodiments of the present disclosure be an interface solution that is subsequently attached to the fixation profile 6.

The cladding device covers a part of at least one such as a part of at least two surfaces of the interface part. In FIG. 7, the cladding device 14 extends in over the end surface 27a of the interface part 6a, and moreover, by means of the first inclining, elongated wall part 14a, over a part of the surface of the interface part 14a facing a envisaged plane P3 extending through the frame opening 2a, in a direction perpendicular to the plane P1, and extending parallel to the longitudinal direction (LD—see FIG. 1) of the fixation profile 6 and the overlapped structural member 8.

FIG. 8 additionally illustrates an embodiment of the present disclosure, wherein the sealing gasket 10 at the interior surface, between the overlapped structural member 8 and the VIG unit surface S2 is a resilient, deflectable gasket comprising deflectable lips, in the present case two lips, but it may also be e.g. 3 or four lips or just 1 lip. This may be a rubber gasket, an elastomer gasket or another suitable gasket solution.

As can furthermore be seen from FIG. 8, the VIG unit 3 may in further embodiments of the present disclosure be held and so to say hang from the fixation wall 6a by means of the bonding seal 9 fixating the VIG unit 3 to the fixation wall 6a of the fixation profile. The gasket 10 would here be further deflected and/or compressed (dependent on the gasket solution) due to gravity acting on the VIG unit 3, in case the bonding seal 9 was removed or the adhesive connection between the wall 6a and the VIG unit surface is removed. Though, the sealing gasket 10 may in embodiments provide a limited support/lifting force on the VIG unit 3 and provide a pressure towards the VIG unit in embodiments of the present disclosure, at least in order to assure sufficient tightness between the gasket 10 and the surface 2. This may also help to assure sufficient tightness between the structural member 8 and the VIG unit in case of that the VIG unit's edge is subjected to substantial thermal deflection so that the surface 2 moves towards and/or away from the gasket 10, thereby further deflecting/compressing the gasket 10 or moves away from the gasket.

As can be seen in FIGS. 5-8, the connection member 6b may in embodiments of the present disclosure extend substantially straight from the fixation wall 6a, with a substantially 90° angle at the transition between the fixation wall 6a and the connection member 6b.

It is however understood that other configurations of the connection member than a substantially straight connection member 6b as illustrated in FIGS. 5-8 may be provided in further aspects of the present disclosure.

The shape of the connection member 6b may be adapted in order to fit a specific surface couture comprising grooves and/or protrusions of the overlapped, structural member 8 to which it is connected.

The part of the connection member/wall, of the fixation profile which is configured to be connected to said frame member may extend in a direction which is between 60° and 120°, such as between 850 and 95°, such as around 90° relative to a plane defined by a major outer surface of the vacuum insulated glass unit, such as the plane P1. Also or alternatively, the shape of the connection member 6b may be adapted in order to e.g. provide a desired resiliency of the fixation profile so as to for example allow the fixation profile 6 to bend/deflect in response to a thermal deflection of the VIG unit's edge (thermal deflection of VIG is described in more details later on), and/or in order to assure a certain stiffness of the fixation profile 6 to for example assure a certain restriction of a thermal deflection of the VIG unit edge(s).

The shape of the connection member 6b may also or alternatively be adapted in order to enable the desired overlap of the structural member 8 by the VIG unit 3, for example in case of if the VIG unit 3 is arranged to extend out over the outermost part of the surface 19b of the overlapped structural member.

Figures 9, 10:
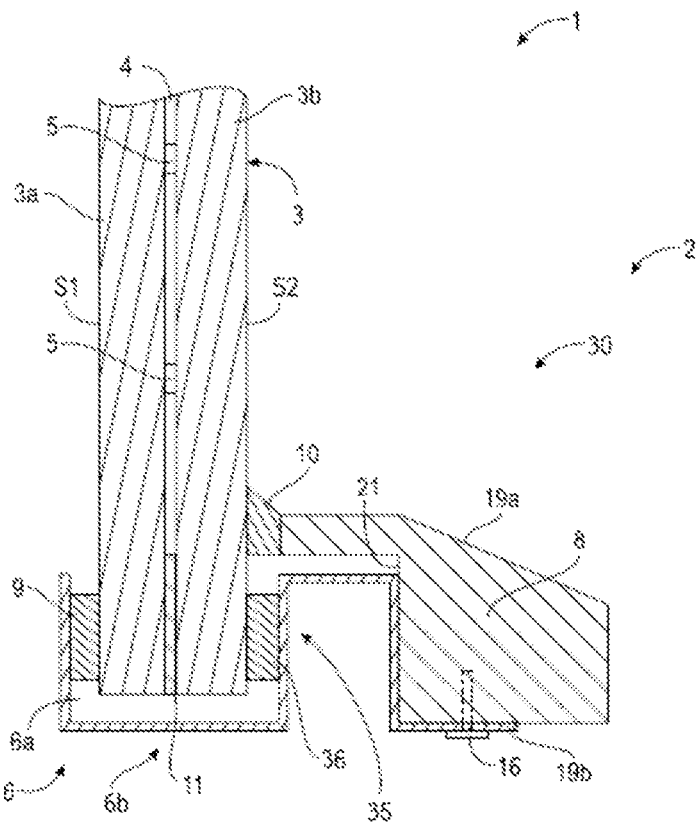

For example, as illustrated in FIG. 9, the connection member may in embodiments of the present disclosure comprise a part 35 that extends in under the VIG unit's interior major surface S2, between the surface S2 and the overlapped member 8. A bonding seal 36 such as a structural adhesive, or alternatively a gasket such as a rubber or elastomer gasket may here be placed between a part of the connection member's part and the VIG unit. This part 35 may in further embodiments be omitted.

FIG. 10 illustrates an embodiment of the present disclosure, wherein the edge surface 7 of the VIG unit 3 extends beyond the outermost part of the outer side surface 19b of the overlapped structural member 8. This may help to get the edge seal 11 further away from the frame opening and help to reduce heat transfer while also enabling a solution where a larger surface area of the exterior surface S1 can be designed to be exposed. Also or alternatively, it may help to enable a solution where the edges of two window panes can be placed closer together. This may be provided in both a sash that cannot be opened, and a sash that can open and close by means of a hinge connection as e.g. previously explained.

In the embodiments illustrated in FIGS. 5-8 and 10, the fixation profile may not comprise parts and/or a wall extending in between the elongated, structural member and the interior major surface S2 of the vacuum insulated glass unit. Thus, the fixation profile may here be substantially free from and unconnected such as un-bonded to the interior outer surface S2 of the vacuum insulated glass unit. This may help to reduce heat transfer at the VIG edge through the edge seal material 11 and to the interior of the building. This may for example be advantageous if the fixation profile 6 comprises metal or is a metal profile has a high thermal conductivity that in some situations, such as when it is colder outside and (intentionally) hotter in the interior of the building, impact negatively on the insulation properties of the frame and hence the window.

However in further embodiments, the fixation profile 6 may comprise a part extending in between the surface S2 and the member 8. This may e.g. help to enable an improved fixation of the VIG unit to the fixation profile in a space optimizing manner, for example in case a bonding seal is also attached to a part of the profile 6 extending in between the member 8 and surface S2.

Figure 11:
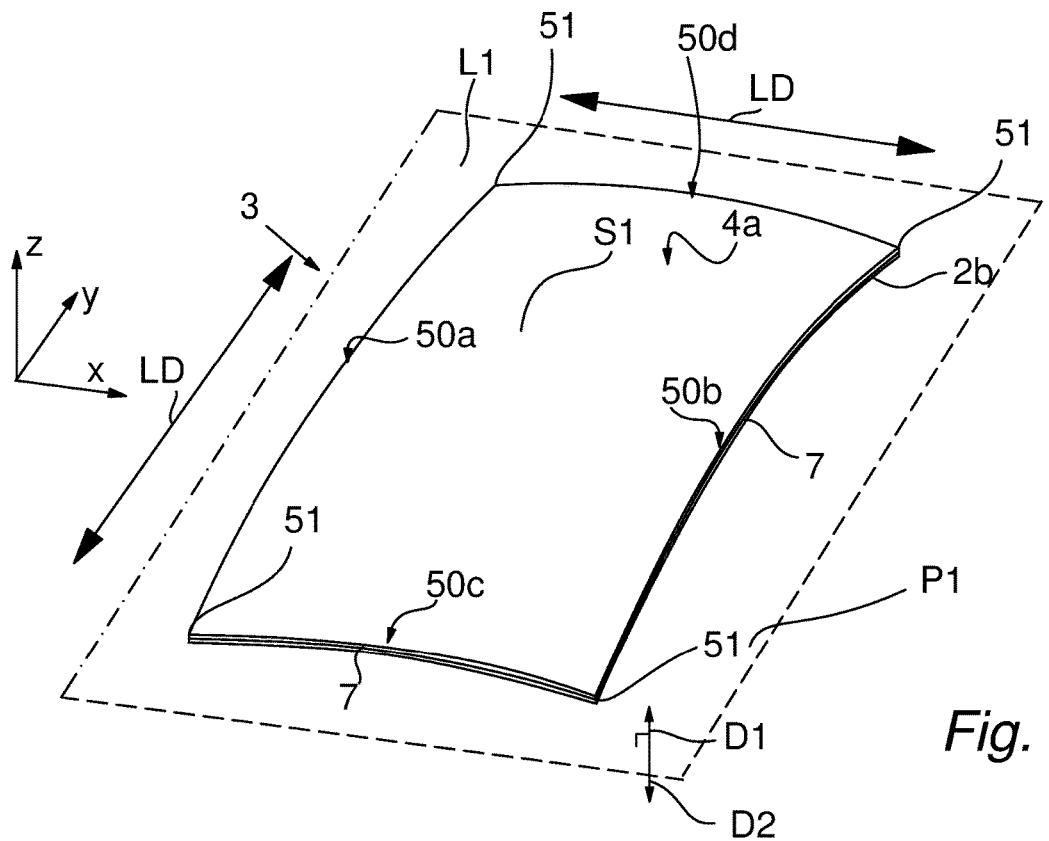
Figure 12:
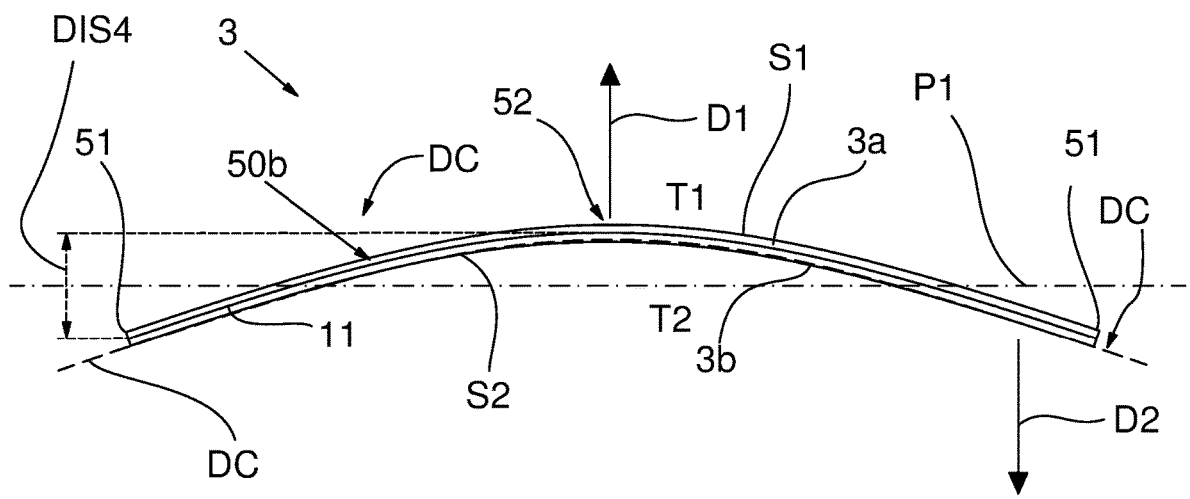

FIGS. 11 and 12 illustrates schematically a VIG unit's 3 thermal deflection as a result of a temperature difference $\Delta T=T1-T2$ between the two VIG unit glass sheets 3a, 3b providing the evacuated gap, according to embodiments of the present disclosure.

The present inventors have by means of computer simulation found out that especially larger VIG units may be subjected to significant deflection of the edges of the VIG unit, and tends to describe an edge deflection curve between the corners where the respective edge terminates.

In FIG. 11, the VIG unit 3 is shown schematically and in perspective, where it can be seen that the outer major surface S1 of the VIG unit 3 obtains a convex shape when a first temperature T1 (See FIG. 12) is higher than temperature T2 at the other side of the VIG unit, side whereas the outer surface S2 of the other (lower) glass sheet 3b (not visible in FIG. 10) provides a concave shape due to the thermal deflection.

The VIG unit 1 deflects relative to the VIG unit plane P1 (determined where $\Delta T$ is substantially zero) and relative to the frame opening, in the directions D1, D2 which are perpendicular to the plane P1.

The VIG unit 3 is rectangular and comprises longer, parallel edges 50a, 50b, and shorter end edges 50c, 50d. The plane P1 extends in the x-y direction. As can be seen the VIG unit edges 50a-50d provides a deflection curve (DC—See FIG. 13) causing the VIG unit edge centre to move in the directions D1, D2 which are in the z direction, relative to the plane P1. This deflection curve DC is described between the corners 51 where the respective edge 50a-50d terminates.

FIG. 12 illustrates schematically and seen from the side onto the long edge 50b, the thermal deflection of the edge 50b. As can be seen, the VIG unit edge 50b tends to describe a deflection curve DC due to thermal deflection of edge 50b, caused by a temperature difference $\Delta T=T1-T2$ between the two glass sheets 3a, 3b. In the present example, the glass sheet 3a is subjected to a higher temperature T1 than the glass sheet 3b which is subjected to temperature T2. This causes the glass sheet 3a to expand more than glass sheet 3b. As the edge seal 11 of the VIG unit may provide a very rigid connection between the glass sheets, this causes the VIG unit 3 to thermally deflect, so that the edges of the glass sheets 3a, 3b moves in the same direction, and this temperature difference causes the edge 50b to describe a deflection curve DC that varies relative to the plane P1.

The outer, major surface S1 of the VIG unit 3 at or near the edge 50b, e.g. at the surface S1 opposite to the edge seal 3 thus obtains a convex shape when T1 is higher than T2 whereas the outer surface S2 of the other (lower) glass sheet 3b provides a concave shape.

As can be seen, the corners 51 of the VIG unit where the edge 8b terminates move in a direction D2 relative to the plane P1, whereas the centre portion 52 of the edge 50b, moves in the opposite direction D1 than the direction D2, relative to the plane P1. This is the case when the VIG unit is not fixed in the frame and is allowed to freely bend.

When/if the glass sheet 3b gets hotter than glass sheet 3a, caused by a temperature change of T1 and/or T2, the corners 51 of the VIG unit moves in the other direction D1 relative to the plane P1 and/or P2, and the centre portion 52 of the edge 50b, move in the direction D2, relative to the plane P1.

In one or more other embodiments of the present disclosure, the largest total edge deflection DIS4 of any of the edges 50a-50d of the vacuum insulated glass unit 3 at a temperature difference $\Delta T=T1-T2$ between the two glass sheets 3a, 3b of 65° C. as compared to the vacuum insulated glass unit at a temperature difference $\Delta T=T1-T2$ of 0° C. is at least 2 mm, such as at least 3 mm or at least 4 mm, such as in the range of 2 mm to 30 mm, preferably in the range of 3 mm to 20 mm. This is in an un-constricted state where the VIG unit is allowed to freely bend. These numbers with regarding to DIS4 may also apply for a laminated VIG unit in embodiments of the present disclosure. The numbers with regarding to DIS4 may apply for a VIG unit having a surface area of the surfaces of above 0.8 m², such as at least 1.1 m², such as above 1.5 m². Here, it may be preferred that at least the longer edges 50a, 50b may be above 1 m in length.

The length of the longest edges (50a, 50b) of the vacuum insulated glass unit may be above 0.8 m, such as above 1.2 m, for example above 1.3 m.

In some embodiments of the present disclosure, the total edge deflection DIS4 will be the sum of the largest distances of positions of the VIG unit edge in question from the plane P1 in each their direction D1, D2 from that plane. In FIG. 12, the largest total edge deflection DIS4 is defined between the deflection of the edge seal 11 at the centre 52 of the edge 50b, and the edge seal 11 at the corner 51 of the same edge, in a direction perpendicular to the plane P1.

In one or more embodiments of the present disclosure, the largest total edge deflection DIS4 of any of the edges 50a-50d of the vacuum insulated glass unit 3 at a temperature difference $\Delta T=T1-T2$ between the two glass sheets 3a, 3b of 65° C. as compared to the vacuum insulated glass unit at a temperature difference $\Delta T$ of 0° C. is at least 0.3% of the length of the deflecting edge, such as in the range of 0.3% to 3.5% of the length of the deflecting edge, such as in the range of 0.4% to 2% of the length of the deflecting edge, such as in the range of 0.6% to 1.5% of the length of the deflecting edge. In one or more further or alternative embodiments of the present disclosure, the largest total edge deflection DIS4 of any of the edges 50a-50d of the vacuum insulated glass unit at a temperature difference between the two glass sheets of 40° C. as compared to the vacuum insulated glass unit at a temperature difference of 0° C. may be at least 0.15% of the length of the deflecting edge, such as in the range of 0.15% to 3% of the length of the deflecting edge, such as in the range of 0.25% to 1.8% of the length of the deflecting edge, such as in the range of 0.35% to 1.2% of the length of the deflecting edge.

FIG. 13 illustrates an example of a situation where a VIG unit 3 is subjected to a varying temperature difference ΔT=T1−T2 between the glass sheets 3a, 3b over time, according to embodiments of the present disclosure.

For example, it is common for e.g. building aperture covers such as windows or doors arranged in openings of outer walls, roofs or the like of a building, that these are subjected to varying temperature differences over time after they have been installed.

For example, with a general room temperature T1 of e.g. about 20° C. in the building, the temperature T2 at the other side (outside a building) of the VIG unit 3 may vary significantly, such as between e.g. 15° C. and 30° C. or even more, over 24 hours.

Even, the temperature difference ΔT=T1−T2 may so to say switch "operational sign" so that the hotter side of the VIG unit 3 may shift one or more times over e.g. hours, many times over a calendar year, or even in the case that a hail, rain or snow shower occurs for a short period of time. This may largely depend on the geographical area where the VIG unit frame assembly is installed, and causes the rate and even direction of the thermal deflection to change over time.

As an example over 24 hours, the outside temperature T2 may start to be 10° C. at 8 PM, and at 3 AM it may be 35° C., and it then gradually decreases again to 10° C. overnight. The inside temperature T1 is set to e.g. be 20° C. the whole 24 hours.

This causes the temperature difference ΔT to switch operational sign: The temperature T1 is 20° C. at the inside, and T2 (outside) is 10° C. at 8 PM. Thus, the VIG unit edge 50b corners 51 deflect in the direction D2 as illustrated in FIG. 13. Then the thermal deflection of the VIG unit edge 50b gradually changes (illustrated by dashed, envisaged deflection curves DC) as the temperature T2 changes to be 35° C. at 3 AM at surface 4b, and thus 15° C. higher than T1. Thus, the VIG unit thermal deflection changes so that the edges 50a-50d deflects in the other direction, and then, it deflects back again as the temperature T2 changes back to the about 10° C. overnight. This may even vary over the year dependent on the time of year, and e.g. in winter time, the outside temperature may be significantly below 0° C., and in the summer time, it may be significantly above 30° C., although the inside room temperature may be desired to be substantially constant, e.g. by help from a room heating system or cooling system (e.g. air-conditioning). These systems may also be known as HVAC (Heating, ventilation, and/or air conditioning).

Accordingly, the thermal deflection of the VIG unit 3 may vary significantly over 24 hours and even more over a longer period such as a calendar year and may depend on different weather conditions. This causes varying stress condition on the VIG unit over time, such as at the edges 50a-50d near the location where the VIG unit glass sheets are connected to seal the evacuated gap by e.g. an edge sealing 11. The stress conditions are complex. Examples of these stresses may be shear stresses at the VIG edge, differential stresses where tensile stress occurs at the deflecting glasses and/or stress concentrations at the corners.

Even more extreme temperature conditions may appear in cases where the VIG unit is installed in a roof window.

The frame 2 may in embodiments of the present disclosure comprise a restriction arrangement for restricting the thermal deflection of the edge(s) 8a-8d, such as for example the longest edges 50a, 50b of the VIG unit or all edges of the VIG unit. This restriction arrangement may comprise a gasket solution, one or more stop parts or walls of the frame preventing an edge deflection above a certain point and/or the like.

In some embodiments of the present disclosure, the fixation profile 6 as previously described (see e.g. FIGS. 5-10) and/or the bonding seal 9 may be configured to allow the edges of the VIG unit 3 to thermally deflect in response to a temperature difference ΔT=T1−T2 between the glass sheets (3a, 3b) of the vacuum insulated glass unit as explained above.

For example, in one or more embodiments the largest edge deflection DIS4 (see FIG. 12) in a deflection direction of any of the edges of the vacuum insulated glass unit at a temperature difference between the two glass sheets of 65° C., as compared to the vacuum insulated glass unit at a temperature difference (ΔT) of 0° C. may be at least 1 mm, such as in the range of 2 mm to 50 mm, preferably in the range of 1, 2 or 3 mm to 15 mm, more preferred in the range of 2 to 10 mm.

This may be provided by that the connection member 6b and/or the fixation wall 6a is forced to deflect by the VIG unit edges due to the thermal deflection of the VIG unit edge. Also or alternatively, the bonding seal 9 may be compressed and/or stretched (dependent on the position along the edge) in response to a thermal deflection of the vacuum insulated glass unit caused by a temperature difference (ΔT) between the glass sheets 3a, 3b of the vacuum insulated glass unit. This changes the thickness (Th1—see FIG. 5) of the bonding seal 9 at one or more locations along the connection wall member 6a when compared to the thickness at the same one or more locations when the temperature difference ΔT is substantially 0° C.

The frame 2 may though be configured to partly restrict a thermal deflection of the vacuum insulated glass unit 3 at the edges 50a-50d in response to a temperature difference ΔT between the glass sheets 3a, 3b of the vacuum insulated glass unit, when compared to a free, unrestricted thermal deflection of the vacuum insulated glass unit at substantially the same temperature difference ΔT. For example, In one or more aspects of the present disclosure, the largest total edge deflection of the edges 50a-50d of the VIG unit 3 may be configured to be at least 10% smaller, such as at least 20% smaller, such as at least 30% smaller than the largest total edge deflection of the unrestricted vacuum insulated glass (VIG) unit at a temperature difference (ΔT=T1−T2) of at least 40° C., such as about 65° C. This restriction may be provided by the bonding seal 9 and/or the fixation profile 6 substantially alone, or in combination with the overlapped structural member 8 that in certain embodiments of the present disclosure may provide a clamping force onto the VIG unit, at least when the edge deflection exceeds a certain level, so that the more edge deflection, the more constriction of the thermal edge deflection of the VIG unit edges.

FIG. 14 illustrates a visualized computer simulation of a "free" thermal deflection of a VIG unit 3 used for a frame 2 according to embodiments of the present disclosure, which has been provided by one of the present inventors. The VIG unit 3 simulated was based on a VIG unit model defined to have the following characteristics:

The VIG unit is laminated and hence comprises a lamination glass and a lamination interlayer
    Length L1 of shorter edges 50c 50d: 114 cm
    Length of the longer edges 50a, 50b: 140 cm
    Glass sheets 3a, 3b Thermally tempered glass sheets each having a thickness of 4 mm.
    Lamination glass: annealed float glass of a thickness of 4 mm
    Edge seal 11 material: solder glass edge seal material The VIG is arranged with the surfaces S1, S2 horizontally (when the temperature difference ΔT=T1−T2 is 0° C.) and is thus simulated so that gravity acts on the VIG unit.

Temperature difference between T1 and T2: about 60° C.

The hotter side (S2) was set to be the lamination glass side and hence the lamination glass sheet provides the outer major surface S2 in FIG. 14.

For the computer simulation model, a temperature difference/gradient profile was established in accordance with temperatures measured across the hotter/heated side. This profile was based on temperature measurements provided during the test described below. This profile was used in the simulation model for the hotter side. The lamination interlayer was a PVB material.

Under these conditions, the simulation results defined that the distance DIS4 from the centre part 52 of the longer edge 50b would be 7.82 mm from the plane P1 (DIS4).

Moreover, under these conditions, the simulation results defined that the distance DIS4 from the centre part 52 of the shorter edge 50c would be 5.15 mm from the plane P1.

Figure 15:
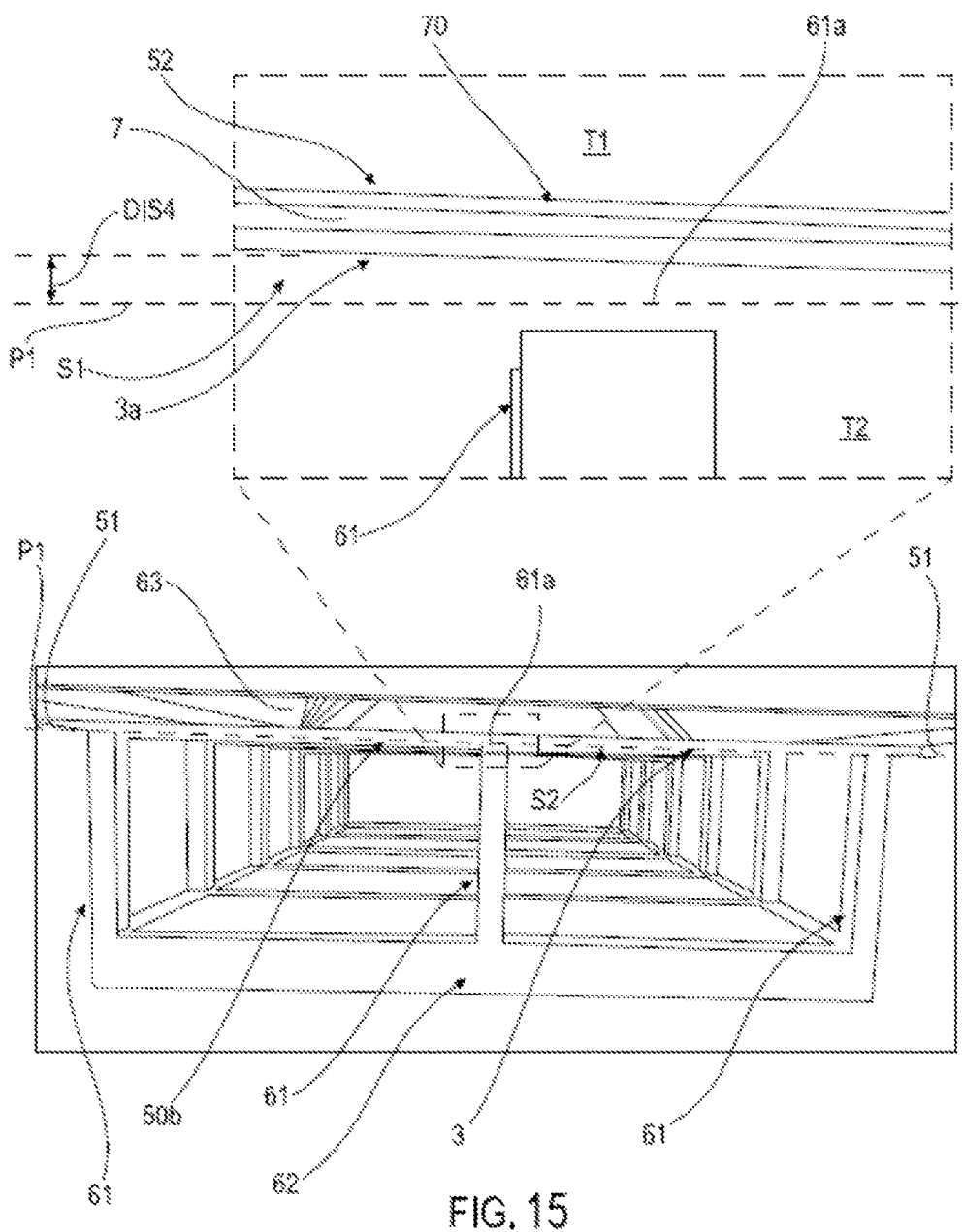
Figure 16:
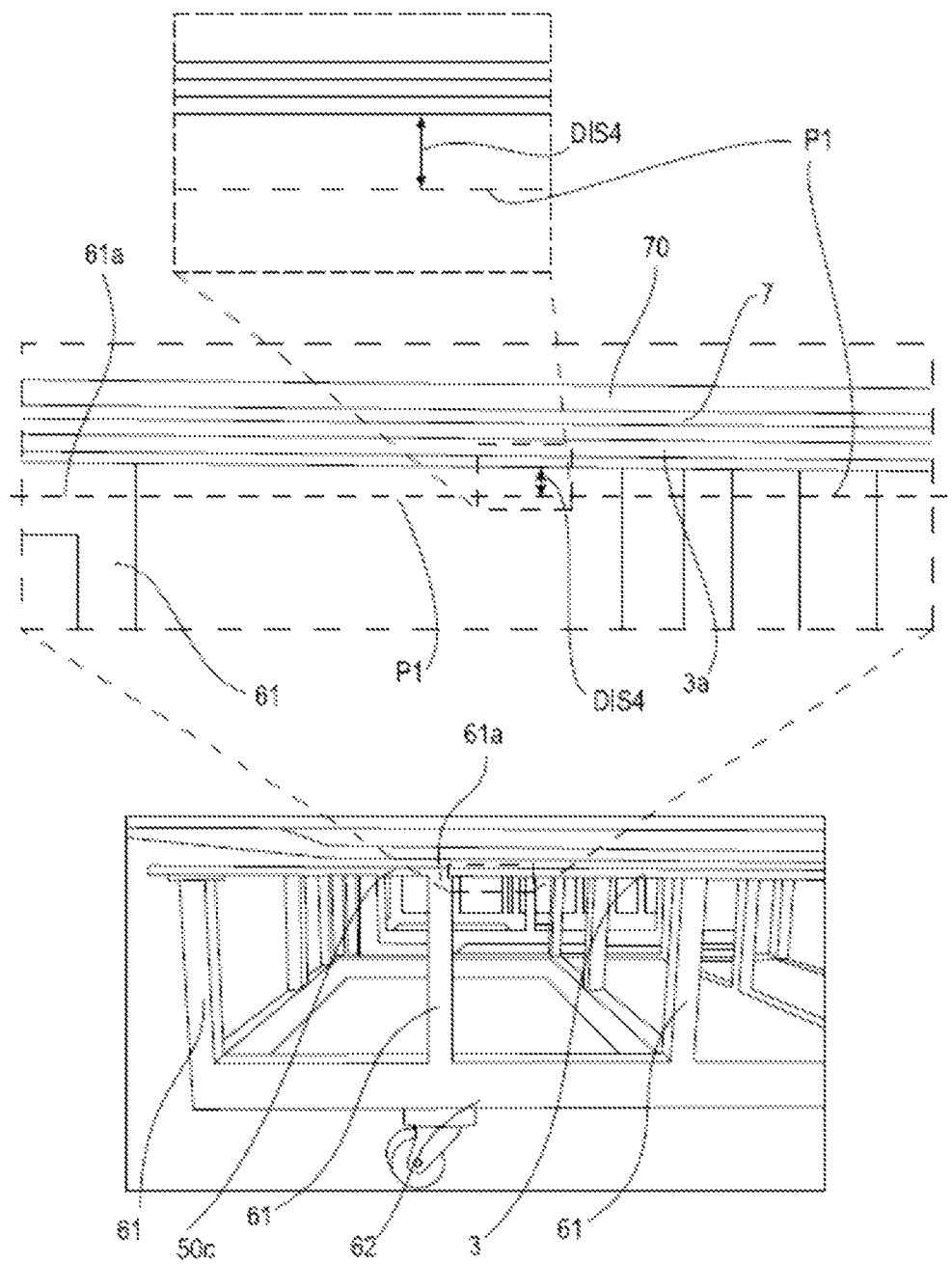

FIGS. 15 and 16 are images of a test of a thermal deflection of a laminated VIG unit 3 having substantially the parameters as defined above with regard to FIG. 14. The VIG unit 3 was placed horizontally to support on support surfaces 61a of a plurality of support rods 61 of a support frame 60. The VIG unit 3 supported initially, when the temperature difference ΔT=T1−T2 was substantially 0° C., on substantially all support surfaces of the frame 62 on which the VIG unit was arranged.

An infrared heat radiation arrangement 63 was arranged above the upper glass sheet, i.e. the lamination glass sheet, and covered the upper glass sheet to a bit beyond the side surfaces 7 of the VIG unit 3. Then the heating arrangement 63 started to heat the upper glass sheet 70 of the VIG unit 3, so that the upper glass sheet reached a maximum temperature of approx. 100° C., and the lower glass was measured to have a temperature of approximately 35° C. It was expected and validated that the temperature of the heated glass facing the radiation heater varied over the surface due to cold bridges caused by among others the edge seal of the VIG unit. Hence, no completely uniform heating was obtained (as opposed to the simulation results), but the maximum temperature measured at the heated glass sheet was about 100° C., and for the majority of the heated surface, the temperature was determined to be above at least 85° C. and at many locations above 90° C.

The present inventors could after the heating by the infrared heating arrangement visually see and confirm a formation of an edge deflection curve DC between the VIG unit corners 51. This provided a maximum edge deflection DIS4 of the VIG unit due to the forced temperature difference ΔT=T1−T2, when compared to the temperature difference ΔT=T1−T2 of substantially 0° C. The distance DIS4 was determined by a first reference point defined by a support surface 61a (that was used as a reference for the plane P1), and the lower surface of the VIG unit 3, in a direction substantially perpendicular to the plane P1.

The maximum edge deflection DIS4 of the long edge 50b (FIG. 19) was measured to be approximately 7.4, or more precisely 7.43 mm at the forced temperature difference, when compared to the temperature difference ΔT=T1−T2 of substantially 0° C.

FIG. 16 illustrates the edge deflection of the shorter edge 50c of the same VIG unit as tested in FIG. 15. Here, in a similar way, the shorter edge 50c described an edge deflection curve DC due to the forced heating and the temperature difference between T1 and T2. Additionally, the maximum edge deflection DIS4 of the edge 5b was measured to be approximately 5.3, or more precisely 5.33 mm, at the forced temperature difference, when compared to the temperature difference ΔT=T1−T2 of substantially 0° C.

Accordingly the maximum tested edge deflection DIS4 vs. the simulated edge deflection resulted in the values of table 1 below.

TABLE 1

|  | Simulated edge deflection DIS4 | Edge deflection test (FIGS. 15-16) DIS4 |
| --- | --- | --- |
| Longer edge 50b | 7.82 mm | 7.43 mm |
| Shorter edge 50c | 5.15 mm | 5.33 mm |

The inventors concluded that the test illustrated in FIGS. 15-16 validated the simulations, and thus confirmed that the VIG unit computer simulations was sufficiently precise and reliable.

Additionally, the test approved that the edges of larger size laminated VIG units having rigid edge seals 11 provided by fused edge seal material such as solder glass or a metal solder, when subjected to a larger temperature difference, will tend to provide/describe an edge deflection curve DC (see e.g. FIGS. 12 and 13) that causes a substantial edge deflection DIS4 in an un-constricted situation where no "outer" mechanical forces constrains the edge deflection. This also applies in laminated VIG units and VIG units without a laminated sheet.

Figure 17:
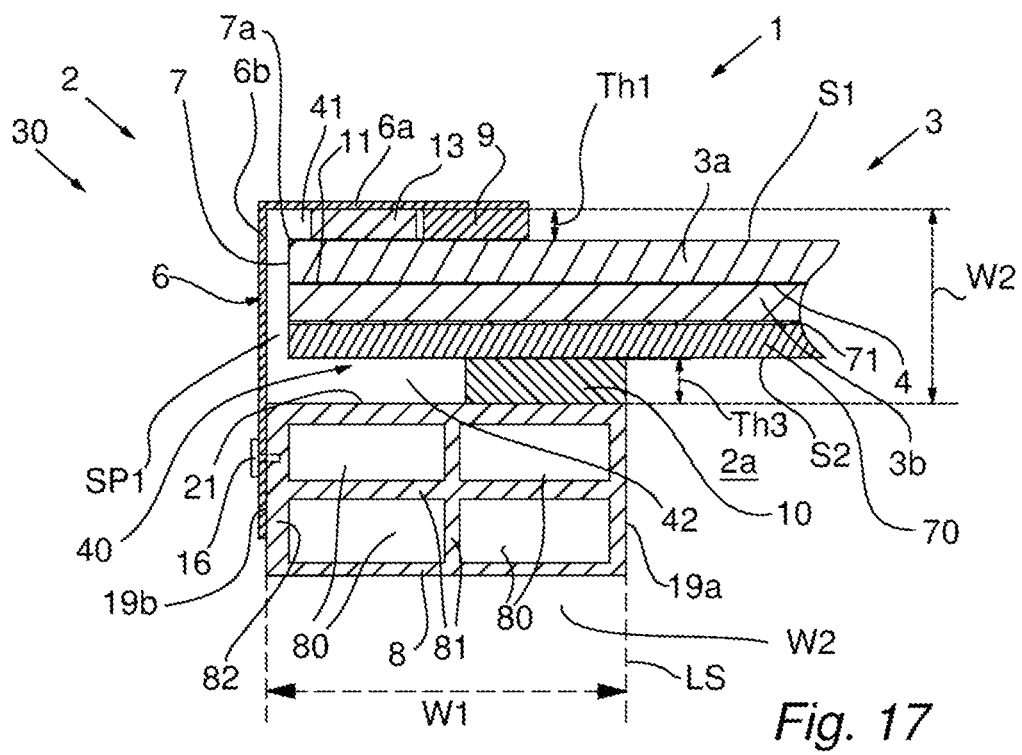

FIG. 17 illustrates an aperture covering such as a window, for example a roof window. The aperture covering 1 substantially corresponds to the aperture covering described in relation to the previously described figures, see in particular FIGS. 5-10 and the description thereto.

However, in FIG. 17, the VIG unit 3 is, in accordance with embodiments of the present disclosure, a laminated VIG unit 3 and accordingly it comprises a lamination glass sheet, 70. The lamination glass sheet 70 may be a tempered, e.g. thermally tempered, glass sheet, or alternatively, it may be an annealed glass sheet, or generally a float glass sheet. This lamination glass sheet 70 is attached/bonded (by means of a lamination interlayer 71) to the outer surface of the VIG unit glass sheet 3b facing towards the interior and thus, away from the exterior surface S1 and the evacuated gap 4. Hence, the lamination glass sheet 70 provides the interior surface S1 of the VIG unit 3. The lamination interlayer 71 may be a PVB or EVA lamination material.

Additionally, FIG. 17 illustrates a further embodiment of the present disclosure, where the overlapped, structural member 8 is not a solid elongated member, but instead it comprises insulation cavities 80. The insulating cavities 80 are separated by partition walls 81 of the structural member 8 which cavities 80 extends in the longitudinal direction LD of the elongated member 8, but such partition walls may also in further embodiments be omitted.

The elongated, structural member 8 may in particular when having insulating cavities 80, be made from a polymer material such as a plastic material, e.g. PVC or PUR and/or a fibre reinforced material such as a glass fibre or carbon fibre reinforced material and/or a composite material. In e.g. such a cases, the overlapped structural member 8 may be manufactured by means of pultrusion and/or extrusion, so as e.g. co-extrusion.

The partition walls and/or the outer walls of the structural member 8 may in further embodiments of the present disclosure comprise one or more strengthening elongated members (not illustrated) embedded in the walls or attached to the walls, in order to provide a structural member 8 with increased inherent rigidity. These strengthening members may be co extruded and/or pultruded with the walls. The strengthening members may e.g. be made from a material such as carbon fibre or glass fibre, it may e.g. be carbon or glass fibre rods or wires, it may be a metal such as steel or aluminium, or it may be a rigid polymer, such as fibre reinforced polymer material.

The insulating cavities 80 may comprise air in embodiments of the present disclosure, or it may be hermetically sealed cavities containing an insulation medium such as an insulating gas. Alternatively, the cavities 80 may be filled with an insulating material, such as a rigid or resilient insulating material, for example an insulating foam, a polystyrene material and/or a glass fibre insulation such as glass or mineral wool.

Figure 18:
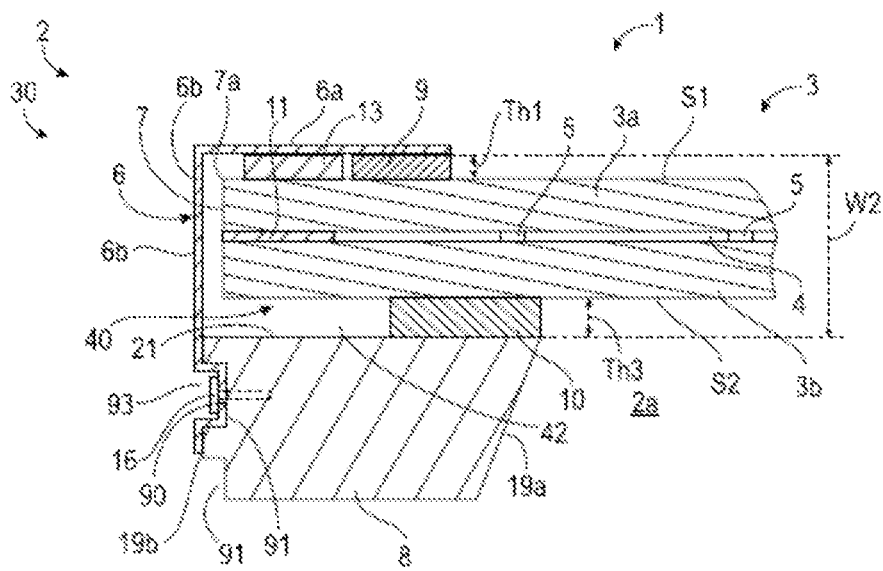

FIG. 18 illustrates an aperture covering 1 wherein the surface 19b facing away from the frame opening 2a comprises an elongated groove 90 and an elongated recess 91, both extending in the longitudinal direction LD, see FIGS. 1, 3 and 4, of the overlapped structural member 8. In FIG. 18, the fixation profile comprises a tongue element 92 extending into the groove, and a mechanical fastener 16 is placed in a recessed portion 93 of the connection member 6b in the tongue 91. It is though understood that in other embodiments, the fastening member may be placed at another location than in the recessed portion 93. In still further embodiments (not illustrated), the tongue 91 may be a solid, single wall part extending from the connection member and into the groove 90.

The surface 19b may also comprise other grooves or recesses for other purposes. Hence, it is generally understood that the surface 19b may in some embodiments of the present disclosure be substantially straight/plane as illustrates in some of the figures previously described, while it in other embodiments may comprise grooves and/or recesses. The same may for that matter apply for the surface 19a.

Figure 19:
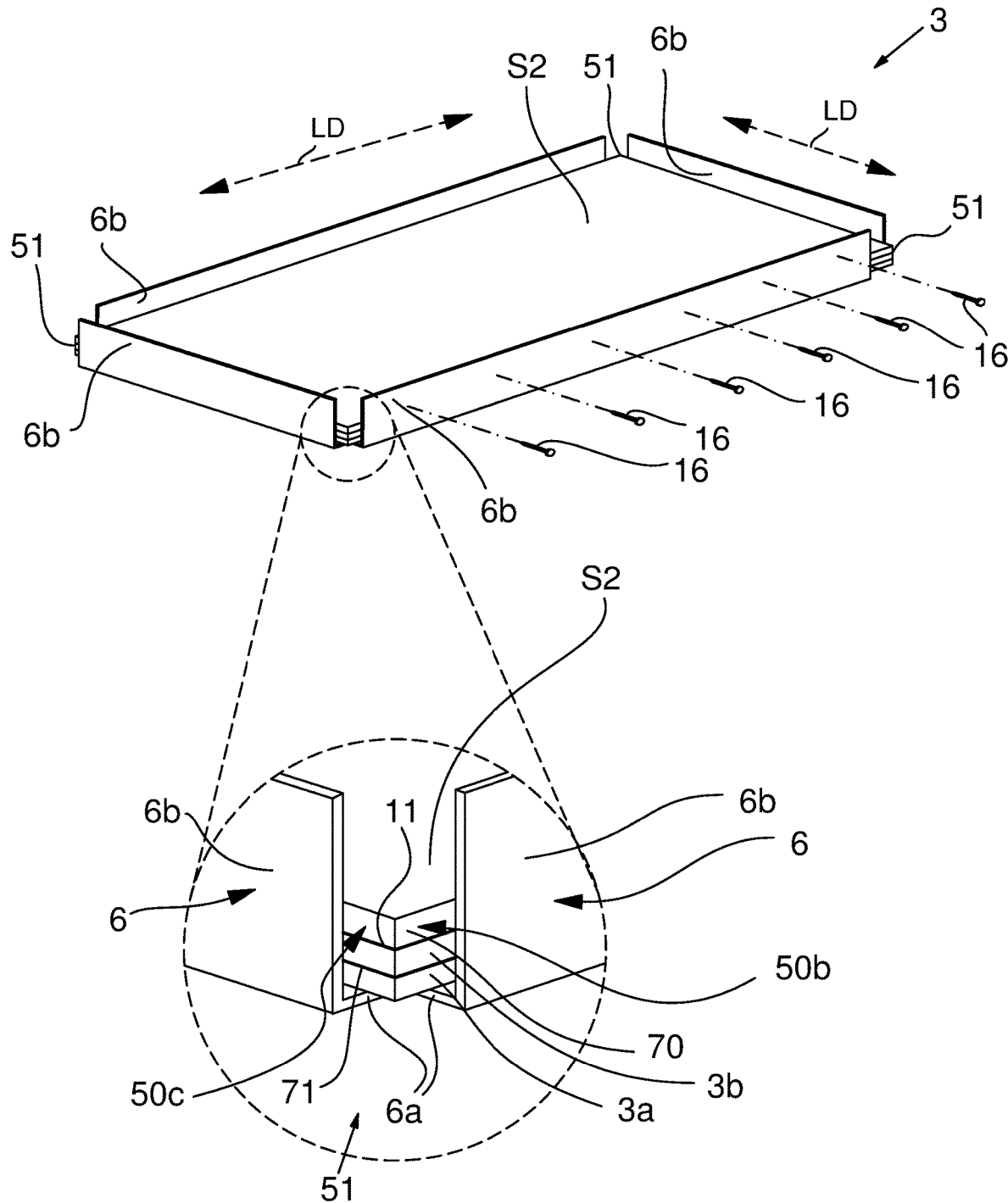

FIG. 19 illustrates a VIG unit according to embodiments of the present disclosure, seen in perspective. The VIG unit 3 comprises elongated fixation profiles 6, in this case four fixation profiles arranged along each their respective VIG unit edge 50a-50d. In other embodiments, the VGG unit may comprise fewer than four fixation profiles 6, such as for example three or two profiles, as this may depend on the frame solution in which the VIG unit should be arranged. As can be seen from also FIG. 19, the elongated fixation profiles comprises a fixation wall 6a which extends opposite to a major surface (in FIG. 19 the surface facing downwards and is thus not visible) of the vacuum insulated glass unit. The fixation wall 6a is fixed to the major surface (S1) of the vacuum insulated glass unit by means of a bonding seal as e.g. previously described. The connection member 6b of the fixation profile 6 extends from the fixation wall 6a so that it comprises a part being opposite to the edge surface 7 of the VIG unit. the connection member 6b extends beyond a plane defined by the surface S2 of the VIG unit, and is configured to be fixed to an elongated, structural frame member (8) of a frame according to e.g. one or more of the embodiments described above in relation to one or more of FIGS. 5-9 and/or 17-18, for example by means of mechanical fasteners.

The connection member 6b may in embodiments of the present disclosure, if e.g. mechanical fasteners 16 such as screws (as illustrated in FIG. 19), pop rivets and/or nails are used for fixating the fixation profile and hence the VIG unit to a frame/sash member, may comprise holes, recesses and/or slits (not illustrated in FIG. 19) for receiving such mechanical fasteners 16. Alternatively, the mechanical fasteners 16 may be forced through and penetrate the connection wall 6b when attaching the VIG unit to the structural elongated member of the frame. Mechanical fasteners 16 are only illustrated in FIG. 19 for fixating the connection member 6b along the longer edge 50b to a frame member, but it is understood that similar mechanical fasteners may be used at the connection members 6b along the other edges 50a and 50c, 50d too.

As mentioned previously, the fixation profile 6 may be made from or comprise a plastic material such as a PVC or PUR material, or a composite material such as a fibre-reinforced composite plate material. The fixation profile may also or alternatively be or comprise a metal profile such as an aluminium profile or steel profile.

In case the profile 6 is a metal profile, it may be preferred that the connection member 6b comprises recesses and/or slits for receiving mechanical fasteners as the metal wall material may be too hard to penetrate. Though, in some embodiments of the present disclosure, the material of the connection wall/member 6b may be made from a metal that is thin and/or soft enough to be penetrated by mechanical fasteners such as screws when using an electrically or pneumatically driven screw driver solution, at least at the area where the fastener 16 is arranged to penetrate the member 6b.

The corner covering parts (not illustrated) at and near the corners 51 of the VIG unit may be provided with a corner covering part comprising a gasket arrangement or silicone tightening or the like in order to ensure water tightness at the corner areas between the ends of the profiles 6 and the VIG unit and frame. These corner covering parts may be made from a plastic material or the like, and also be pre-mounted at the VIG unit prior to installing the VIG unit in a frame by attaching the connection members 6b to a frame member such as a sash member.

The above disclosure is generally described as relating to a building aperture cover in the form of architectural aperture coverings, more particular in the form of window solutions. It is generally understood that these window solutions may e.g. be for vertical windows where the VIG unit is arranged with the plane P1 arranged with an angle of substantially 90° compared to horizontal. In further aspects of the present disclosure, the window is a roof window where the VIG unit 3 is arranged with an angle different from vertical, for example where the plane P1 is arranged with an angle between 5° and 90°, such as between 10° and 750 or 5° and 85°, compared to horizontal. It is however understood that the solutions disclosed above may also be used in architectural aperture coverings in the form of doors comprising windows.

In further embodiments of the present disclosure, the VIG unit frame 2 solutions disclosed in this document may be used as architectural aperture coverings in or as curtain walls.

In still further embodiments of the present disclosure, the VIG unit frame 2 solutions disclosed in this document may be aperture coverings in the form of gates/doors and/or walls of cooling appliances such as freezers or refrigerators, for example of refrigerators for storing food for human consumption at a temperature below 7° C. such as below 5° C., e.g. below 0° C., or below −10° C., such as between −5° C. and −30° C., and where the content such as goods placed inside the cooling appliances should be visible from the exterior of the cooling appliances by looking through the VIG unit.

While the present disclosure has been described in detail in connection with only a limited number of embodiments or aspects, it should be readily understood that the present disclosure is not limited to such disclosed embodiments or aspects. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

The invention claimed is:

1. An aperture covering, wherein said aperture covering comprises:
   a vacuum insulated glass unit comprising a first glass sheet and a second glass sheet, wherein an evacuated gap is placed between the first and second glass sheets, and wherein a plurality of support structures are distributed in the evacuated gap, and wherein a rigid, fused edge seal seals the evacuated gap,
   a frame enclosing a frame opening,
   elongated fixation profiles each of which are fixed to and arranged parallel to an elongated structural frame member,
   wherein each elongated fixation profile comprises a fixation wall which extends opposite to an exterior major surface of the vacuum insulated glass unit and is fixed to the exterior major surface of the vacuum insulated glass unit by means of a bonding seal,
   wherein the fixation profile comprises a connection member extending from said fixation wall wherein the connection member is fixed to the elongated, structural frame member,
   wherein the elongated structural member faces the opposite interior major surface of the vacuum insulated glass unit placed opposite to the exterior major surface of the vacuum insulated glass unit,
   wherein the evacuated gap overlaps the elongated structural member, and
   wherein the edges of the vacuum insulated glass unit extends into a receiving slot provided by the frame, and wherein the receiving slot has a width which is larger than 1.5 times the thickness of the part of the vacuum insulated glass unit which extends into the receiving slot.

2. An aperture covering according to claim 1, wherein the bonding seal is a flexible, elongated adhesive sealing stripe bonding to the exterior major surface of the vacuum insulated glass unit and to a surface of the fixation wall facing the exterior major surface, wherein said bonding seal includes or is a structural adhesive.

3. An aperture covering according to claim 2, wherein the structural adhesive is a silicon adhesive, a silane-terminated polyurethane adhesive or a Modified-Silyl Polymer adhesive, wherein at least said fixation wall of the fixation profile comprises a metal surface, and wherein said bonding seal is attached to said metal surface.

4. An aperture covering according to claim 3, wherein said fixation profile is a metal profile.

5. An aperture covering according to claim 1, wherein the bonding seal has a thickness above 4 mm, wherein the thickness is determined in a direction perpendicular to the exterior major surface at a temperature difference between the glass sheets of the VIG unit of substantially 0° C.

6. An aperture covering according to claim 1, wherein said bonding seal is arranged to bond to the exterior major surface so that the bonding seal material is terminated before and does not extend to the edge surface of the vacuum insulated glass unit.

7. An aperture covering according to claim 1, wherein the bonding seal is located to partly or fully lap over an edge seal of the vacuum insulated glass unit.

8. An aperture covering according to claim 1, wherein the evacuated gap overlaps the elongated structural member by between 15 mm and 100 mm, where the distance is determined parallel to a plane defined by an outer major surface of the vacuum insulated glass unit and is determined from the inner surface of the edge seal facing the evacuated gap, and to a line of sight through the vacuum insulated glass unit and the frame opening.

9. An aperture covering according to claim 1, wherein the fixation wall and/or the connection member of the fixation profile is a substantially solid, single walled construction.

10. An aperture covering according to claim 1, wherein the elongated structural member overlaps the opposite interior major surface of the vacuum insulated glass unit with a larger overlapping distance than the overlapping distance with which the fixation wall overlaps the exterior major surface.

11. An aperture covering according to claim 1, wherein the elongated structural member overlaps the opposite interior major surface of the vacuum insulated glass unit with an overlapping distance, wherein said overlapping distance is at least 25 mm.

12. An aperture covering according to claim 1, wherein the connection member and the fixation wall together substantially provides an angle bracket shape, when seen in a plane which extends perpendicular to the longitudinal direction of the fixation profile.

13. An aperture covering according to claim 1, wherein the vacuum insulated glass unit overlaps at least 60% of the largest width of the elongated, structural frame member, wherein said width is measured in a direction parallel to a major surface of the VIG unit, and in a direction perpendicular to the longitudinal direction of the elongated, structural frame member.

14. An aperture covering according to claim 1, wherein a gasket strip is arranged between the elongated structural member and the interior major surface, wherein the gasket strip has a height which is above 4 mm at a temperature difference between the two glass sheets of substantially 0° C., and wherein said height is measured in a direction substantially perpendicular to the interior major surface.

15. An aperture covering according to claim 1, wherein the vacuum insulated glass unit is a laminated vacuum insulated glass unit comprising a lamination glass attached to the vacuum insulated glass unit by means of an interlayer, wherein said aperture covering is a window for covering an aperture in a building.

16. An aperture covering according to claim 1, wherein said frame is a movable sash which is connected to a fixation frame by means of a displacement mechanism configured to allow the sash to move relative to the fixed frame, wherein said fixation frame comprises elongated fixation frame members, wherein the connection member of the fixation profile is configured to extend between the overlapped elongated structural member and an elongated fixation frame member, at least when the sash is in a closed position.

17. An aperture covering according to claim 1, wherein the edge seal extends around the periphery of the vacuum insulated glass unit and seals the evacuated gap, and wherein said edge seal comprises a glass material or a metal solder edge seal material, wherein said bonding seal and/or said fixation profile is/are configured to allow edges of the vacuum insulated glass unit to describe an edge deflection curve between corners of the vacuum insulated glass unit due to a thermal deflection of the vacuum insulated glass unit, where the edge deflection curve is provided in a direction perpendicular to a plane defined by an outer major surface of the vacuum insulated glass unit when the temperature difference between the glass sheets of the vacuum insulated glass unit is substantially 0° C.

18. An aperture covering according to claim 1, wherein a further adhesive material, is placed between the fixation wall and the exterior major surface, and wherein the further adhesive material is fixed to at least one of the fixation wall and the exterior major surface of the vacuum insulated glass unit.

19. An aperture covering according to claim 1, wherein the receiving slot has a width which is no more than 4 times the thickness of the part of the vacuum insulated glass unit which extends into the receiving slot, wherein the receiving slot provides a space of at least 3 mm at one or both sides of the vacuum insulated glass unit, determined in a direction normal to the outer surfaces of the vacuum insulated glass unit at a temperature difference between the glass sheets of the vacuum insulated glass unit of substantially 0° C.

20. An aperture covering according to claim 1, wherein a minimum distance between an outer major surface of the vacuum insulated glass unit and wall surfaces of said frame and/or fixation profile is at least 4 mm at a temperature difference between the two glass sheets of the vacuum insulated glass unit of substantially 0° C.

* * * * *